United States Patent
Sengupta et al.

(10) Patent No.: US 10,756,791 B2
(45) Date of Patent: Aug. 25, 2020

(54) MULTI-USER CONTROL CHANNEL TRANSMISSION TECHNIQUES

(71) Applicant: QUALCOMM Incorporated, San Diego, CA (US)

(72) Inventors: Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/443,559

(22) Filed: Jun. 17, 2019

(65) Prior Publication Data

US 2019/0386718 A1    Dec. 19, 2019

Related U.S. Application Data

(60) Provisional application No. 62/687,229, filed on Jun. 19, 2018.

(51) Int. Cl.
*H01B 7/02* (2006.01)
*H04B 7/0456* (2017.01)
(Continued)

(52) U.S. Cl.
CPC ......... *H04B 7/0456* (2013.01); *H04B 7/0452* (2013.01); *H04B 7/0626* (2013.01); *H04L 1/0038* (2013.01); *H04L 5/0005* (2013.01); *H04L 27/2676* (2013.01)

(58) Field of Classification Search
CPC .. H04B 7/0456; H04B 7/0452; H04B 7/0626; H04L 1/0038; H04L 5/0005; H04L 27/2676

(Continued)

(56) References Cited

U.S. PATENT DOCUMENTS

2014/0071952 A1* 3/2014 Kim ..................... H04L 5/001
                                                                370/335
2014/0153427 A1* 6/2014 Seo ......................... H04L 1/20
                                                                370/252

(Continued)

FOREIGN PATENT DOCUMENTS

| EP | 2566092 A1 | 3/2013 |
|---|---|---|
| WO | WO-2017039737 A1 | 3/2017 |
| WO | WO-2017197125 A1 | 11/2017 |

OTHER PUBLICATIONS

International Search Report and Written Opinion—PCT/US2019/037783—ISA/EPO—dated Sep. 4, 2019. (183786WO).

(Continued)

*Primary Examiner* — Don N Vo
(74) *Attorney, Agent, or Firm* — Holland & Hart LLP

(57) ABSTRACT

Methods, systems, and devices for wireless communications are described that provide for multiple-input multiple-output (MIMO) transmissions of control information using downlink control channel resources, such as physical downlink control channel (PDCCH) resources. The MIMO transmissions may provide control channel transmissions to multiple UEs using the same time-frequency resources. A base station may use a subset of control channel monitoring entities for MIMO control channel transmissions, and another subset of control channel monitoring candidates for non-MIMO control channel transmissions. Control channel monitoring entities for MIMO transmissions may be defined separately from non-MIMO or legacy control channel candidates.

26 Claims, 21 Drawing Sheets

(51) Int. Cl.
*H04L 27/26* (2006.01)
*H04B 7/06* (2006.01)
*H04L 5/00* (2006.01)
*H04L 1/00* (2006.01)
*H04B 7/0452* (2017.01)

(58) Field of Classification Search
USPC .................................................. 375/262, 267
See application file for complete search history.

(56) References Cited

U.S. PATENT DOCUMENTS

| | | | | |
|---|---|---|---|---|
| 2014/0301283 | A1* | 10/2014 | Frenne | H04L 5/0037 370/329 |
| 2015/0189630 | A1* | 7/2015 | Aiba | H04W 72/042 370/329 |
| 2019/0037548 | A1* | 1/2019 | Costa | H04B 7/0617 |

OTHER PUBLICATIONS

NTT Docomo et al: "Multi-beam Operation for PDCCH,"3GPP Draft; R1-1713932, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017, XP051316724, 7 pages, Retrieved from the Internet: URL: http://www.3pp.org/ftp/Meetings_3GPP_SYNC/RAN1/Docs/ [retrieved on Aug. 20, 2017] sections 2.1, 2.2, 2.4.

Samsung: "DL Control Channel Design," 3GPP Draft; R1-1612524 DL Control, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051176471, 5 pages, Retrieved from the Internet: URL: http://www.3gpp.org/ftp/Meetings_3GPP_SYNC/RAN1/Docs/ [retrieved on Nov. 13, 2016] sections 1, 2.

* cited by examiner

MULTI-USER CONTROL CHANNEL TRANSMISSION TECHNIQUES

CROSS REFERENCE

The present Application for Patent claims the benefit of U.S. Provisional Patent Application No. 62/687,229 by Sengupta et al., entitled "MULTI-USER CONTROL CHANNEL TRANSMISSION TECHNIQUES," filed Jun. 19, 2018, assigned to the assignee hereof, and expressly incorporated by reference in its entirety herein.

BACKGROUND

The following relates generally to wireless communications, and more specifically to multi-user control channel transmission techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Control information in some wireless communications systems may be transmitted from a base station to a UE using control channel resources, such as physical downlink control channel (PDCCH) resources. In some cases, if a base station is serving a relatively large number of UEs, control channel resources may become constrained and limit an amount of downlink control information that can be transmitted to the UEs, which may result in delays for control information transmissions to some UEs. Techniques that may allow for control information transmission in a more efficient and reliable manner to serve a relatively large number of UEs may therefore be beneficial.

SUMMARY

The described techniques relate to improved methods, systems, devices, and apparatuses that support multi-user control channel transmission techniques. According to various aspects, the described techniques provide for transmissions of control information (e.g., multiple-input multiple-output (MIMO) control transmissions) using downlink control channel resources (e.g., physical downlink control channel (PDCCH) resources). In some cases, multi-user (MU) MIMO transmissions to multiple UEs using the same time-frequency resources may be transmitted by a base station. A base station may use, in some examples, a first subset of control channel monitoring candidates for precoded or MIMO control channel transmissions and a second subset of control channel monitoring candidates for non-precoded or non-MIMO control channel transmissions. In some examples, a base station may use control channel candidates that are to be monitored by a UE for control transmissions (e.g., precoded or MIMO), which are defined separately from non-precoded, non-MIMO, or legacy control channel candidates. In some cases, precoded control channel candidates may refer to resources that are to be monitored for MIMO control channel transmissions, and non-precoded control channel candidates may refer to resources that are to be monitored for non-MIMO control channel transmissions.

A UE that is capable of receiving precoded (e.g., MIMO) control channel transmissions may monitor for precoded transmissions in configured control channel resources. In some cases, a UE-specific reference signal (UE-RS) may be transmitted (e.g., a demodulation reference signal (DMRS)) with the precoded control channel transmissions and the UE may receive the precoded control channel transmissions based on the UE-RS. In other cases, a cell-specific reference signal (CRS) may be used by the UE to receive precoded (e.g., MIMO) control channel transmissions in conjunction with blind decoding using one or more different precoding candidates that are available for the MIMO control channel transmissions. In some cases, the MIMO transmissions may be MU-MIMO transmissions, single-user (SU) MIMO transmissions, or beamformed control channel transmissions (e.g., rank-1 beamformed transmissions).

A method of wireless communication is described. The method may include transmitting, from a UE, an indication that the UE is capable of supporting MIMO for receiving downlink control channel communications, monitoring, based on the transmission of the indication, a first subset of a set of downlink control channel resources for downlink control channel information from a base station, the first subset of downlink control channel resources having MIMO downlink control channel information transmissions, and communicating with the base station based on downlink control channel information received from the base station via the first subset of downlink control channel resources.

An apparatus for wireless communication is described. The apparatus may include a processor, memory in electronic communication with the processor, and instructions stored in the memory. The instructions may be executable by the processor to cause the apparatus to transmit, from a UE, an indication that the UE is capable of supporting MIMO for receiving downlink control channel communications, monitor, based on the transmission of the indication, a first subset of a set of downlink control channel resources for downlink control channel information from a base station, the first subset of downlink control channel resources having MIMO downlink control channel information transmissions, and communicate with the base station based on downlink control channel information received from the base station via the first subset of downlink control channel resources.

Another apparatus for wireless communication is described. The apparatus may include means for transmitting, from a UE, an indication that the UE is capable of supporting MIMO for receiving downlink control channel communications, monitoring, based on the transmission of the indication, a first subset of a set of downlink control channel resources for downlink control channel information from a base station, the first subset of downlink control channel resources having MIMO downlink control channel information transmissions, and communicating with the base station based on downlink control channel information received from the base station via the first subset of downlink control channel resources.

A non-transitory computer-readable medium storing code for wireless communication is described. The code may include instructions executable by a processor to transmit, from a UE, an indication that the UE is capable of supporting MIMO for receiving downlink control channel communications, monitor, based on the transmission of the indication, a first subset of a set of downlink control channel resources for downlink control channel information from a base station, the first subset of downlink control channel resources having MIMO downlink control channel information transmissions, and communicate with the base station based on downlink control channel information received from the base station via the first subset of downlink control channel resources.

In some examples of the method, apparatuses, and non-transitory computer-readable medium described herein, the set of downlink control resources include a set of monitoring candidates for downlink control channel information, the set of monitoring candidates including a first subset of monitoring candidates for MU-MIMO downlink control channel information transmissions and a second subset of monitoring candidates for additional downlink control channel communications, where the first subset of monitoring candidates correspond to the first subset of downlink control channel resources and the second subset of monitoring candidates correspond to a second subset of the set of downlink control channel resources that may be different than the first subset of downlink control channel resources. In some examples of the method, apparatuses, and non-transitory computer-readable medium described herein, the second subset of the set of downlink control channel resources may be non-overlapping with the first subset of downlink control channel resources.

In some examples of the method, apparatuses, and non-transitory computer-readable medium described herein, the monitoring may include operations, features, means, or instructions for determining the first subset of downlink control channel resources based on a cell identification (cell ID) of the base station, one or more predetermined monitoring candidates, or any combination thereof.

In some examples of the method, apparatuses, and non-transitory computer-readable medium described herein, the first subset of downlink control resources include a first set of monitoring entities for MIMO downlink control channel communications and a second subset of the set of downlink control resources includes a second set of monitoring candidates for non-MIMO downlink control channel communications, and where the first subset of downlink control resources and the second subset of downlink control resources may be separately defined. In some examples of the method, apparatuses, and non-transitory computer-readable medium described herein, a portion of the first subset of downlink control resources puncture the second subset of downlink control resources.

In some examples of the method, apparatuses, and non-transitory computer-readable medium described herein, the first subset of downlink control resources includes UE-RS transmissions, and where the monitoring may be based on the UE-RS transmissions. In some examples of the method, apparatuses, and non-transitory computer-readable medium described herein, the downlink control channel information transmissions in the first subset of downlink control channel resources may be precoded based on the UE-RS transmissions.

In some examples of the method, apparatuses, and non-transitory computer-readable medium described herein, the first subset of downlink control channel resources includes two or more sets of monitoring entities, and where a first set of monitoring entities may be precoded using a first precoding matrix, and a second set of monitoring entities may be precoded using a second precoding matrix. In some examples of the method, apparatuses, and non-transitory computer-readable medium described herein, a first monitoring entity and a second monitoring entity of the first set of monitoring entities share UE-RS transmissions and may have a same precoding.

In some examples of the method, apparatuses, and non-transitory computer-readable medium described herein, the monitoring may include operations, features, means, or instructions for blindly decoding downlink control channel transmissions in the first subset of downlink control channel resources using multiple different precoding candidates that may be predefined for the downlink control channel transmissions. In some examples of the method, apparatuses, and non-transitory computer-readable medium described herein, a set of available precoding candidates for blind decoding may be mapped to each of one or more monitoring occasions within the first subset of downlink control channel resources. In some examples of the method, apparatuses, and non-transitory computer-readable medium described herein, a first monitoring occasion and a second monitoring occasion of the one or more monitoring occasions may have a same precoding candidate.

Some examples of the method, apparatuses, and non-transitory computer-readable medium described herein may further include operations, features, means, or instructions for measuring one or more channel state information (CSI) parameters based on one or more reference signals received from the base station, transmitting a CSI report to the base station based on the measuring and where the set of available precoding candidates for blind decoding may be based on the CSI report. In some examples of the method, apparatuses, and non-transitory computer-readable medium described herein, the CSI report includes a precoding matrix indicator (PMI), and where an initial blind decoding may be based on the PMI.

In some examples of the method, apparatuses, and non-transitory computer-readable medium described herein, the set of downlink control channel resources include common search space candidates that include common control information for two or more UEs, and UE-specific search space candidates that include UE-specific control information for a single UE, and where the first subset of downlink control channel resources may be for transmission of the UE-specific control information. In some examples of the method, apparatuses, and non-transitory computer-readable medium described herein, the first subset of downlink control channel resources include at least a first UE-specific search space candidate, and at least a second UE-specific search space candidate may be transmitted in a second subset of downlink control channel resources for non-MIMO control channel transmissions.

In some examples of the method, apparatuses, and non-transitory computer-readable medium described herein, the blind decoding may be performed based on a downlink control information (DCI) format associated with the downlink control channel transmissions, and where downlink control channel transmissions having a first DCI format may be not precoded, and downlink control channel transmissions having a second DCI format may be precoded.

In some examples of the method, apparatuses, and non-transitory computer-readable medium described herein, a first portion of the first subset of downlink control channel resources include UE-RS transmissions for use in decoding associated downlink control channel transmissions, and a second portion of the first subset of downlink control channel resources include precoded transmissions that may be blindly decoded at the UE. In some examples of the method, apparatuses, and non-transitory computer-readable medium described herein, an indication of whether UE-RS transmissions or blind decoding may be to be used may be received in radio resource control (RRC) signaling.

In some examples of the method, apparatuses, and non-transitory computer-readable medium described herein, the first subset of downlink control channel resources may be non-overlapping with physical control format indicator channel (PCFICH) resources and physical hybrid automatic repeat request (HARQ) indicator channel (PHICH) resources. In some examples of the method, apparatuses, and non-transitory computer-readable medium described herein, the set of downlink control channel resources may be rate-matched around CRS resources.

In some examples of the method, apparatuses, and non-transitory computer-readable medium described herein, the indication that the UE is capable of supporting MIMO for receiving downlink control channel communications includes an explicit indication transmitted to the base station or an implicit indication based on one or more parameters transmitted to the base station. Some examples of the method, apparatuses, and non-transitory computer-readable medium described herein may further include operations, features, means, or instructions for receiving an indication from the base station that the first subset of downlink control channel resources include MIMO downlink control channel information transmissions. In some examples of the method, apparatuses, and non-transitory computer-readable medium described herein, the indication from the base station may be based on a number of CRS ports configured for the set of downlink control channel resources. In some examples of the method, apparatuses, and non-transitory computer-readable medium described herein, the first subset of the set of downlink control channel resources may be identified based on a cell ID of the base station.

In some examples of the method, apparatuses, and non-transitory computer-readable medium described herein, the set of downlink control resources include a set of monitoring candidates for downlink control channel information, the set of monitoring candidates including a first subset of monitoring candidates for SU-MIMO downlink control channel information transmissions using SU-MIMO precoders and a second subset of monitoring candidates for additional downlink control channel communications. In some examples of the method, apparatuses, and non-transitory computer-readable medium described herein, the first subset of downlink control channel resources may be precoded according to a rank-1 beamformed transmission.

Some examples of the method, apparatuses, and non-transitory computer-readable medium described herein may further include operations, features, means, or instructions for determining whether to perform the monitoring of the first subset of downlink control channel resources for MIMO downlink control channel information transmissions based on a number of control symbols configured for downlink control channel information transmissions. In some examples of the method, apparatuses, and non-transitory computer-readable medium described herein, the first subset of downlink control channel resources may be determined based on an aggregation level for monitoring for the downlink control channel transmissions.

Some examples of the method, apparatuses, and non-transitory computer-readable medium described herein may further include operations, features, means, or instructions for receiving, prior to the monitoring, an initial control channel transmission from that base station that provides one or more monitoring parameters for monitoring the first subset of downlink control channel resources. In some examples of the method, apparatuses, and non-transitory computer-readable medium described herein, the initial control channel transmission may have a DCI format that may be specific to MIMO downlink control channel transmissions and indicates one or more of, an indication of MU-MIMO, SU-MIMO, or rank-1 beamforming is enabled for the MIMO downlink control channel transmissions, an indication of whether a UE-RS or blind decoding is to be used for decoding the MIMO downlink control channel transmissions, information for one or more precoding candidate sets for decoding the MIMO downlink control channel transmissions, or information that provides one or more specific resources that are dedicated for the MIMO downlink control channel transmissions.

A method of wireless communication is described. The method may include receiving, at a base station from a UE, an indication that the UE is capable of supporting MIMO for receiving downlink control channel communications, configuring, based on the indication, a first subset of a set of downlink control channel resources for downlink control channel information transmissions from the base station, the first subset of downlink control channel resources for MIMO downlink control channel information transmissions, and transmitting MIMO downlink control channel transmissions to the UE via the first subset of downlink control channel resources.

An apparatus for wireless communication is described. The apparatus may include a processor, memory in electronic communication with the processor, and instructions stored in the memory. The instructions may be executable by the processor to cause the apparatus to receive, at a base station from a UE, an indication that the UE is capable of supporting MIMO for receiving downlink control channel communications, configure, based on the indication, a first subset of a set of downlink control channel resources for downlink control channel information transmissions from the base station, the first subset of downlink control channel resources for MIMO downlink control channel information transmissions, and transmit MIMO downlink control channel transmissions to the UE via the first subset of downlink control channel resources.

Another apparatus for wireless communication is described. The apparatus may include means for receiving, at a base station from a UE, an indication that the UE is capable of supporting MIMO for receiving downlink control channel communications, configuring, based on the indication, a first subset of a set of downlink control channel resources for downlink control channel information transmissions from the base station, the first subset of downlink control channel resources for MIMO downlink control channel information transmissions, and transmitting MIMO downlink control channel transmissions to the UE via the first subset of downlink control channel resources.

A non-transitory computer-readable medium storing code for wireless communication is described. The code may include instructions executable by a processor to receive, at a base station from a UE, an indication that the UE is capable of supporting MIMO for receiving downlink control channel communications, configure, based on the indication, a first subset of a set of downlink control channel resources for downlink control channel information transmissions from the base station, the first subset of downlink control channel resources for MIMO downlink control channel information transmissions, and transmit MIMO downlink control channel transmissions to the UE via the first subset of downlink control channel resources.

In some examples of the method, apparatuses, and non-transitory computer-readable medium described herein, the set of downlink control resources include a set of monitoring candidates for downlink control channel information, the set of monitoring candidates including a first subset of monitoring candidates for MU-MIMO downlink control channel information transmissions and a second subset of monitoring candidates for additional downlink control channel communications, where the first subset of monitoring candidates correspond to the first subset of downlink control channel resources and the second subset of monitoring candidates correspond to a second subset of the set of downlink control channel resources that may be different than the first subset of downlink control channel resources.

In some examples of the method, apparatuses, and non-transitory computer-readable medium described herein, the first subset of downlink control resources include a first set of monitoring candidates for MIMO downlink control channel communications and a second subset of the set of downlink control resources includes a second set of monitoring candidates for non-MIMO downlink control channel communications, and where the first subset of downlink control resources and the second subset of downlink control resources may be separately defined. In some examples of the method, apparatuses, and non-transitory computer-readable medium described herein, a portion of the first subset of downlink control resources puncture the second subset of downlink control resources.

In some examples of the method, apparatuses, and non-transitory computer-readable medium described herein, the first subset of downlink control channel resources include UE-RS transmissions for use in decoding the MIMO downlink control channel transmissions. In some examples of the method, apparatuses, and non-transitory computer-readable medium described herein, the UE-RS transmissions may be based on precoding that may be applied to the MIMO downlink control channel transmissions.

In some examples of the method, apparatuses, and non-transitory computer-readable medium described herein, a first precoding may be applied to MIMO downlink control channel transmissions in a first set of monitoring candidates within the first subset of downlink control channel resources, and a second precoding may be applied to MIMO downlink control channel transmissions in a second set of monitoring candidates within the first subset of downlink control channel resources. In some examples of the method, apparatuses, and non-transitory computer-readable medium described herein, a first MIMO downlink control channel transmission and a second MIMO downlink control channel transmission of the first set of monitoring candidates share UE-RS transmissions and may have a same precoding.

In some examples of the method, apparatuses, and non-transitory computer-readable medium described herein, the UE blindly decodes downlink control channel transmissions in the first subset of downlink control channel resources using multiple different precoding candidates that may be predefined for the downlink control channel transmissions. In some examples of the method, apparatuses, and non-transitory computer-readable medium described herein, a set of available precoding candidates for blind decoding may be mapped to each of one or more monitoring occasions within the first subset of downlink control channel resources.

Some examples of the method, apparatuses, and non-transitory computer-readable medium described herein may further include operations, features, means, or instructions for receiving a CSI report from the UE and precoding downlink control channel transmissions in the first subset of downlink control channel resources based on the CSI report. In some examples of the method, apparatuses, and non-transitory computer-readable medium described herein, the CSI report includes a PMI, and where the precoding may be based on the PMI.

In some examples of the method, apparatuses, and non-transitory computer-readable medium described herein, the set of downlink control channel resources include common search space candidates that include common control information for two or more UEs, and UE-specific search space candidates that include UE-specific control information for a single UE, and where the first subset of downlink control channel resources may be for transmission of the UE-specific control information. In some examples of the method, apparatuses, and non-transitory computer-readable medium described herein, the first subset of downlink control channel resources include at least a first UE-specific search space candidate, and at least a second UE-specific search space candidate may be transmitted in a second subset of downlink control channel resources for non-MIMO control channel transmissions.

Some examples of the method, apparatuses, and non-transitory computer-readable medium described herein may further include operations, features, means, or instructions for precoding applied to downlink control channel transmissions in the first subset of downlink control channel resources to be selected based on a DCI format associated with the downlink control channel transmissions, and where downlink control channel transmissions having a first DCI format may be not precoded, and downlink control channel transmissions having a second DCI format may be precoded.

In some examples of the method, apparatuses, and non-transitory computer-readable medium described herein, a first portion of the first subset of downlink control channel resources include UE-RS transmissions for use in decoding associated downlink control channel transmissions, and a second portion of the first subset of downlink control channel resources include precoded transmissions that may be blindly decoded at the UE.

In some examples of the method, apparatuses, and non-transitory computer-readable medium described herein, the first subset of downlink control channel resources may be non-overlapping with PCFICH resources and PHICH resources. In some examples of the method, apparatuses, and non-transitory computer-readable medium described herein, the set of downlink control channel resources may be rate-matched around CRS resources.

In some examples of the method, apparatuses, and non-transitory computer-readable medium described herein, the indication that the UE is capable of supporting MU-MIMO for receiving downlink control channel communications includes an explicit indication transmitted to the base station or an implicit indication based on one or more other parameters transmitted to the base station. Some examples of the method, apparatuses, and non-transitory computer-readable medium described herein may further include operations, features, means, or instructions for transmitting an indication to the UE that the first subset of downlink control channel resources include MIMO downlink control channel information transmissions. In some examples of the method, apparatuses, and non-transitory computer-readable medium described herein, the indication may be an implicit indication based on a number of CRS ports configured for the set of downlink control channel resources.

A method of wireless communication is described. The method may include monitoring a first subset of a set of downlink control channel resources for downlink control information from a base station, the first subset of the set of downlink control channel resources being associated with precoded downlink control channel transmissions, decoding a precoded downlink control channel transmission from the first subset of the set of downlink control channel resources based on applying one or more precoding candidates to a cell-specific reference signal, and communicating with the base station based on the downlink control information decoded from the precoded downlink control channel transmission.

An apparatus for wireless communication is described. The apparatus may include a processor, memory coupled with the processor, and instructions stored in the memory. The instructions may be executable by the processor to cause the apparatus to monitor a first subset of a set of downlink control channel resources for downlink control information from a base station, the first subset of the set of downlink control channel resources being associated with precoded downlink control channel transmissions, decode a precoded downlink control channel transmission from the first subset of the set of downlink control channel resources based on applying one or more precoding candidates to a cell-specific reference signal, and communicate with the base station based on the downlink control information decoded from the precoded downlink control channel transmission.

Another apparatus for wireless communication is described. The apparatus may include means for monitoring a first subset of a set of downlink control channel resources for downlink control information from a base station, the first subset of the set of downlink control channel resources being associated with precoded downlink control channel transmissions, decoding a precoded downlink control channel transmission from the first subset of the set of downlink control channel resources based on applying one or more precoding candidates to a cell-specific reference signal, and communicating with the base station based on the downlink control information decoded from the precoded downlink control channel transmission.

A non-transitory computer-readable medium storing code for wireless communication is described. The code may include instructions executable by a processor to monitor a first subset of a set of downlink control channel resources for downlink control information from a base station, the first subset of the set of downlink control channel resources being associated with precoded downlink control channel transmissions, decode a precoded downlink control channel transmission from the first subset of the set of downlink control channel resources based on applying one or more precoding candidates to a cell-specific reference signal, and communicate with the base station based on the downlink control information decoded from the precoded downlink control channel transmission.

In some examples of the method, apparatuses, and non-transitory computer-readable medium described herein, the decoding the precoded downlink control channel transmission further may include operations, features, means, or instructions for blindly decoding the precoded downlink control channel transmissions in the first subset of the set of downlink control channel resources using the one or more precoding candidates.

In some examples of the method, apparatuses, and non-transitory computer-readable medium described herein, a set of available precoding candidates for the blind decoding may be mapped to each of one or more monitoring occasions within the first subset of the set of downlink control channel resources.

In some examples of the method, apparatuses, and non-transitory computer-readable medium described herein, a first monitoring occasion and a second monitoring occasion of the one or more monitoring occasions may be associated with a same precoding candidate.

Some examples of the method, apparatuses, and non-transitory computer-readable medium described herein may further include operations, features, means, or instructions for measuring one or more CSI parameters based on one or more reference signals received from the base station, transmitting a CSI report to the base station based on the measuring, and where the set of available precoding candidates for the blindly decoding may be based on the CSI report.

In some examples of the method, apparatuses, and non-transitory computer-readable medium described herein, the CSI report includes a PMI, and where a first precoding candidate for the blindly decoding may be based on the PMI.

In some examples of the method, apparatuses, and non-transitory computer-readable medium described herein, the set of downlink control channel resources include common search space candidates including common control information for two or more UEs, and UE-specific search space candidates including UE-specific control information for a single UE, and where the first subset of the set of downlink control channel resources may be for transmission of the UE-specific control information.

In some examples of the method, apparatuses, and non-transitory computer-readable medium described herein, the first subset of the set of downlink control channel resources include at least a first UE-specific search space entity, and at least a second UE-specific search space entity may be transmitted in a second subset of the set of downlink control channel resources for non-multiple-input multiple-output (MIMO) control channel transmissions.

In some examples of the method, apparatuses, and non-transitory computer-readable medium described herein, the blind decoding may be performed for a first DCI format associated with a first subset of the set of downlink control channel resources associated with the precoded downlink control channel transmissions and a second DCI format associated with a second subset of the set of downlink control channel resources associated with a non-precoded downlink control channel transmissions.

In some examples of the method, apparatuses, and non-transitory computer-readable medium described herein, the second subset of the set of downlink control channel resources include UE-RS transmissions for decoding associated downlink control channel transmissions.

Some examples of the method, apparatuses, and non-transitory computer-readable medium described herein may further include operations, features, means, or instructions for receiving an indicator of whether UE-RS transmissions or the blind decoding may be to be used in RRC signaling.

In some examples of the method, apparatuses, and non-transitory computer-readable medium described herein, the set of downlink control channel resources include a set of monitoring candidates for the downlink control information, the set of monitoring candidates including a first subset of monitoring candidates for multi-user (MU) multiple-input multiple-output (MIMO) downlink control channel transmissions and a second subset of monitoring candidates for non-MU-MIMO downlink control channel communications.

In some examples of the method, apparatuses, and non-transitory computer-readable medium described herein, the first subset of monitoring candidates corresponds to the first subset of downlink control channel resources, and the second subset of monitoring candidates corresponds to a second subset of downlink control channel resources that is different than the first subset of downlink control channel resources, and where the first subset of downlink control channel resources and the second subset of downlink control channel resources are separately defined.

In some examples of the method, apparatuses, and non-transitory computer-readable medium described herein, the first subset of the set of downlink control channel resources may be non-overlapping with PCFICH resources and PHICH resources.

In some examples of the method, apparatuses, and non-transitory computer-readable medium described herein, the set of downlink control channel resources may be rate-matched around cell-specific reference signal resources.

A method of wireless communication is described. The method may include configuring a first subset of a set of downlink control channel resources for downlink control information at a base station, the first subset of the set of downlink control channel resources being associated with precoded downlink control channel transmissions and transmitting a precoded downlink control channel transmission to a UE via the first subset of the set of downlink control channel resources.

An apparatus for wireless communication is described. The apparatus may include a processor, memory coupled with the processor, and instructions stored in the memory. The instructions may be executable by the processor to cause the apparatus to configure a first subset of a set of downlink control channel resources for downlink control information at a base station, the first subset of the set of downlink control channel resources being associated with precoded downlink control channel transmissions and transmit a precoded downlink control channel transmission to a UE via the first subset of the set of downlink control channel resources.

Another apparatus for wireless communication is described. The apparatus may include means for configuring a first subset of a set of downlink control channel resources for downlink control information at a base station, the first subset of the set of downlink control channel resources being associated with precoded downlink control channel transmissions and transmitting a precoded downlink control channel transmission to a UE via the first subset of the set of downlink control channel resources.

A non-transitory computer-readable medium storing code for wireless communication is described. The code may include instructions executable by a processor to configure a first subset of a set of downlink control channel resources for downlink control information at a base station, the first subset of the set of downlink control channel resources being associated with precoded downlink control channel transmissions and transmit a precoded downlink control channel transmission to a UE via the first subset of the set of downlink control channel resources.

In some examples of the method, apparatuses, and non-transitory computer-readable medium described herein, the UE blindly decodes the precoded downlink control channel transmission in the first subset of the set of downlink control channel resources using one or more precoding candidates in the first subset of the set of downlink control channel resources using the one or more precoding candidates corresponding to the precoded downlink control channel transmissions.

In some examples of the method, apparatuses, and non-transitory computer-readable medium described herein, a set of available precoding candidates for blind decoding may be mapped to each of one or more monitoring occasions within the first subset of the set of downlink control channel resources.

Some examples of the method, apparatuses, and non-transitory computer-readable medium described herein may further include operations, features, means, or instructions for receiving a CSI report from the UE, and precoding the downlink control channel transmissions in the first subset of the set of downlink control channel resources based on the CSI report.

In some examples of the method, apparatuses, and non-transitory computer-readable medium described herein, the CSI report includes a PMI, and where the precoding may be based on the PMI.

In some examples of the method, apparatuses, and non-transitory computer-readable medium described herein, the set of downlink control channel resources include common search space candidates including common control information for two or more UEs, and UE-specific search space candidates including UE-specific control information for a single UE, and where the first subset of the set of downlink control channel resources may be for transmission of the UE-specific control information.

Some examples of the method, apparatuses, and non-transitory computer-readable medium described herein may further include operations, features, means, or instructions for selecting a precoder for the downlink control channel transmissions in the first subset of the set of downlink control channel resources based on a first DCI format associated with a first subset of the downlink control channel transmissions, where a second DCI format may be associated with a second subset of the downlink control channel transmissions may be not precoded.

In some examples of the method, apparatuses, and non-transitory computer-readable medium described herein, the set of downlink control channel resources include a set of monitoring candidates for the downlink control information, the set of monitoring candidates including a first subset of monitoring candidates for multi-user (MU) multiple-input multiple-output (MIMO) downlink control channel transmissions and a second subset of monitoring candidates for non-MU-MIMO downlink control channel communications.

In some examples of the method, apparatuses, and non-transitory computer-readable medium described herein, the first subset of monitoring candidates corresponds to the first subset of downlink control channel resources, and the second subset of monitoring candidates corresponds to a second subset of downlink control channel resources that is different than the first subset of downlink control channel resources, and where the first subset of downlink control channel resources and the second subset of downlink control channel resources are separately defined.

DETAILED DESCRIPTION

Figure 1:
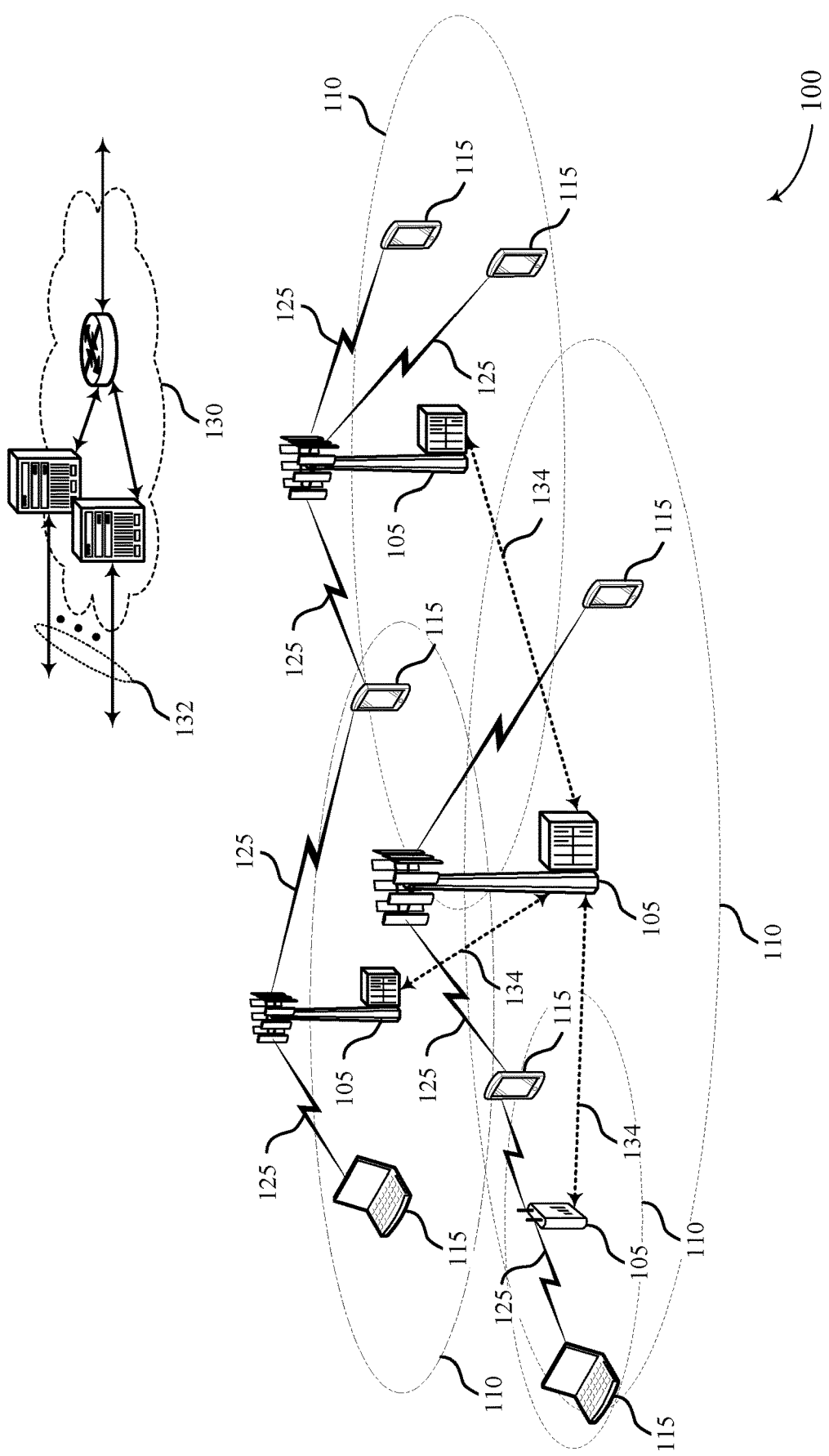
FIG. 1 illustrates an example of a system for wireless communications that supports multi-user control channel transmission techniques in accordance with aspects of the present disclosure.

Various techniques described herein provide for precoded or multiple-input multiple-output (MIMO) transmissions of control information using downlink control channel resources (e.g., physical downlink control channel (PDCCH) resources). In some cases, multi-user MIMO (MU-MIMO) transmissions to multiple UEs using the same time-frequency resources may be transmitted by a base station. In other cases, single-user (SU) MIMO transmissions to a single UE may be transmitted by a base station using precoding techniques or beamforming techniques (e.g., precoding corresponding to a rank-1 beamformed transmission) as discussed herein.

In some cases, a base station may configure a set of control channel monitoring candidates for both UEs that are capable of receiving precoded (e.g., MIMO) transmissions and UEs that are incapable of receiving precoded transmissions. In some cases, a subset of the configured set of control channel monitoring candidates may be used for precoded (e.g., MIMO) downlink control channel transmissions. In other cases, a different set of control channel monitoring candidates may be configured for UEs that are capable of receiving MIMO transmissions, where the set of control channel monitoring candidates for MIMO downlink control channel transmissions may be configured separately from the set of control channel monitoring candidates and which in some cases may puncture resources of the set of control channel monitoring candidates. Thus, in some cases, precoded control channel candidates may refer to resources that are to be monitored for MIMO control channel transmissions, and control channel candidates may refer to resources that are to be monitored for non-MIMO control channel transmissions.

A UE that is capable of receiving precoded control channel transmissions may monitor for precoded transmissions in configured precoded control channel resources (e.g., within a subset of control channel monitoring candidates or within separate precoded control channel monitoring candidates, as described herein). For example, a separate control resource set (CORESET) or search space may be configured for the precoded control channel monitoring candidates. In some cases, a UE-specific reference signal (UE-RS) may be transmitted (e.g., a demodulation reference signal (DMRS)) with the MIMO control channel transmissions and the UE may receive the MIMO control channel transmissions based on the UE-RS. In other cases, a cell-specific reference signal (CRS) may be used by the UE to receive precoded downlink control channel transmissions in conjunction with blind decoding using one or more different precoding candidates that are available for the control channel transmissions. In some cases, the precoding candidates may be based on channel state information (CSI) measurements made at the UE. Additionally or alternatively, the precoding candidates may be predefined, determined based on a cell identification (cell ID) of the base station, configured by higher layer signaling, or any combination thereof. In some cases, a combination of UE-RS based and CRS based approaches may be employed for MIMO downlink control channel transmissions (e.g., based on a number of UEs multiplexed in MIMO PDCCH a certain time-frequency resources). In some cases, the MIMO transmissions may be MU-MIMO transmissions, single-user (SU) MIMO transmissions, or beamformed control channel transmissions (e.g., rank-1 beamformed transmissions).

Such MIMO transmissions of downlink control channel information may allow a base station to more efficiently serve a number of UEs relative to control channel transmissions that do not use MIMO transmissions. Additionally, MIMO transmission techniques (e.g., SU-MIMO or rank-1 beamformed transmissions) such as discussed herein may be used to help enhance reliability of downlink control channel transmissions to UEs.

Aspects of the disclosure are initially described in the context of a wireless communications system. Various examples of control channel resources that may be used for MIMO downlink control channel transmissions and then described. Aspects of the disclosure are further illustrated by and described with reference to apparatus diagrams, system diagrams, and flowcharts that relate to multi-user control channel transmission techniques.

FIG. 1 illustrates an example of a wireless communications system 100 that supports multi-user control channel transmission techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may use MIMO transmission techniques for downlink control channel transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, downlink control channel (e.g., PDCCH) transmissions may be transmitted using MIMO techniques. For example, a base station 105 may use MU-MIMO techniques for transmissions to multiple UEs 115 using the same time-frequency resources. In other cases, SU-MIMO transmissions to a single UE 115 may be transmitted by a base station 105 using precoding techniques or beamforming techniques (e.g., precoding corresponding to a rank-1 beamformed transmission) as discussed herein.

Figure 2:
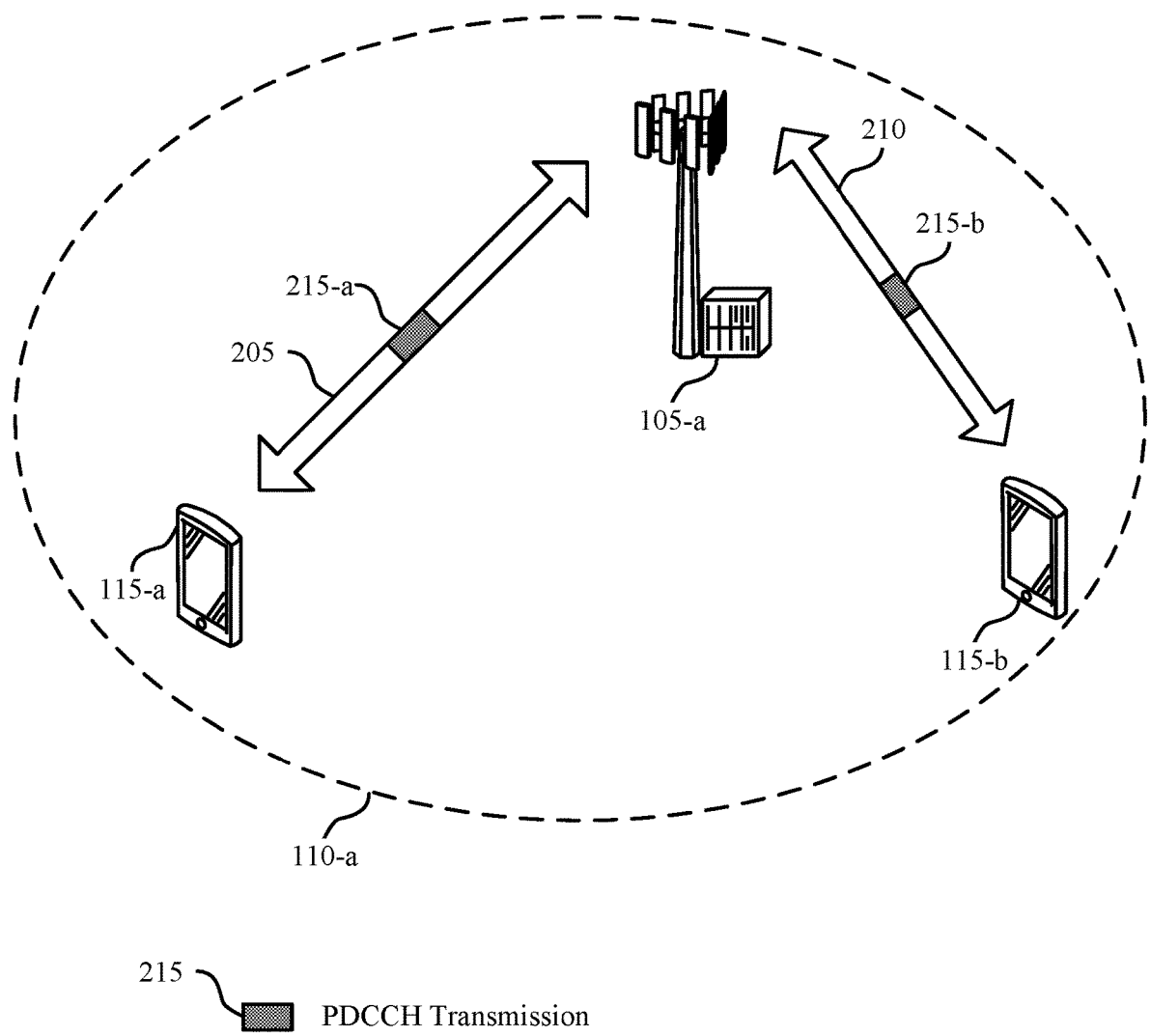
FIG. 2 illustrates an example of a portion of a wireless communications system that supports multi-user control channel transmission techniques in accordance with aspects of the present disclosure.

FIG. 2 illustrates an example of a wireless communications system 200 that supports multi-user control channel transmission techniques in accordance with aspects of the present disclosure. In some examples, wireless communications system 200 may implement aspects of wireless communications system 100. Wireless communications system 200 may include a base station 105-*a*, and a first UE 115 115-*a* and a second UE 115-*b* that may be present in coverage area 110-*a*. While two UEs 115 are illustrated in FIG. 2, other examples may have numerous additional UEs present in a coverage area, with some UEs 115 being capable of receiving precoded (e.g., MIMO) downlink control channel transmissions and other UEs 115 being incapable of receiving precoded downlink control channel transmissions. While various examples described herein illustrate multi-user control channel transmission techniques using LTE or NR between UEs 115 and base station 105-*a*, it will be understood that techniques provided herein may be used in other communications systems that may use different radio access technologies (RATs) and communications protocols.

In the example of FIG. 2, the base station 105-*a* may establish a first communication link 205 with first UE 115-*a*, and a second communication link 210 with the second UE 115-*b*. In some cases, each of the first UE 115-*a* and the second UE 115-*b* may be capable of receiving precoded downlink control channel transmissions, such as PDCCH transmissions 215 that may use MIMO techniques. In some cases, PDCCH transmissions 215 may include a first PDCCH transmission 215-*a* to the first UE 115-*a* and a second PDCCH transmission 215-*b* to the second UE 115-*b*. Both the first PDCCH transmission 215-*a* and the second PDCCH transmission 215-*b* may use the same time-frequency resources, and may be transmitted by the base station 105-*a* using MU-MIMO techniques.

In some cases, as described herein, the base station 105-*a* may configure a first set of control channel monitoring candidates for both UEs 115. In some cases, a subset of the first set of control channel monitoring candidates may be used for precoded downlink control channel transmissions. In other cases, a different set of precoded control channel monitoring candidates may be configured for UEs 115, where the set of MIMO control channel monitoring candidates is configured separately (e.g., in a separate CORESET, in a separate search space) from the first set of control channel monitoring candidates and which in some cases may puncture resources of the first set of control channel monitoring candidates.

Each UE 115 may monitor for MIMO transmissions in the configured MIMO control channel resources (e.g., within the subset of control channel monitoring candidates or within precoded control channel monitoring candidates, as described herein). In some cases, a UE-RS may be transmitted (e.g., a DMRS) with the precoded control channel transmissions and each UE 115 may receive the precoded control channel transmissions based on the UE-RS. In other cases, a CRS may be used by the UEs 115 to receive precoded downlink control channel transmissions in conjunction with blind decoding using one or more different precoding candidates that are available for the precoded control channel transmissions. In some cases, the precoding candidates may be based on CSI measurements made at the UE. Additionally or alternatively, the precoding candidates may be predefined, determined based on a cell ID of the base station, configured by higher layer signaling, or any combination thereof. In some cases, a combination of UE-RS based and CRS based approaches may be employed for precoded downlink control channel transmissions (e.g., based on a number of UEs 115 multiplexed using MIMO for certain PDCCH time-frequency resources). In some cases, the precoded transmissions may be MU-MIMO transmissions, single-user (SU) MIMO transmissions, or beamformed control channel transmissions (e.g., rank-1 beamformed transmissions).

Figure 3:
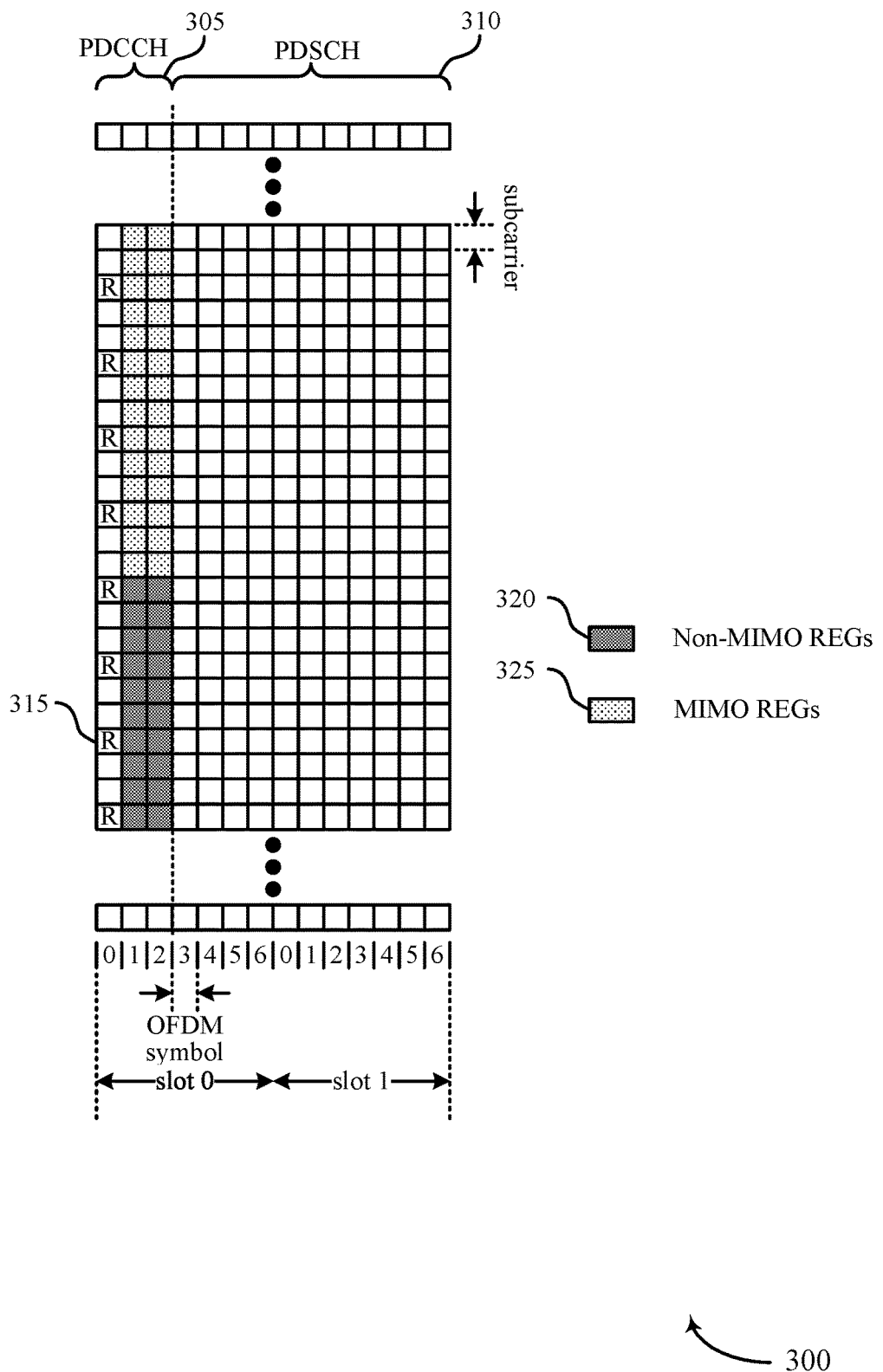
FIG. 3 illustrates an example of downlink resources that support multi-user control channel transmission techniques in accordance with aspects of the present disclosure.

FIG. 3 illustrates an example of downlink resources 300 that support multi-user control channel transmission techniques in accordance with aspects of the present disclosure. In some examples, downlink resources 300 may implement aspects of wireless communications system 100. In this example, downlink resources 300 include PDCCH resources 305 and physical downlink shared channel (PDSCH) resources 310. The PDCCH resources 305 in this case are located in the first three OFDM symbols of a first slot of a subframe, and PDSCH resources 310 occupy the remaining OFDM symbols in the subframe.

In some existing, also referred to as legacy, deployments, each UE may monitor a specified set of PDCCH candidates to look for PDCCH transmissions. Such PDCCH transmissions may include common control information and UE-specific control information. Each PDCCH candidate is a collection of control channel elements (CCEs), where each CCE includes nine Resource Element Groups (REGs). In the example of FIG. 3, a portion of a first subset of non-MIMO REGs 320 are illustrated, and a portion of a second subset of MIMO REGs 325 are illustrated. While the non-MIMO REGs 320 and MIMO REGs 325 are illustrated as occupying contiguous time-frequency resources, mapping of such REGs may result in non-contiguous time-frequency resources in other cases. Thus the illustration of contiguous REGs in FIG. 3 are provided for purposes of illustration and discussion only, and techniques as discussed herein may apply to other types of non-contiguous mappings of CCEs, REGs, or combinations thereof.

According to aspects of the present disclosure, to improve PDCCH capacity (e.g., to increase a number of UEs that may be served by a base station), base stations and UEs that have more than one antenna port for transmitting and receiving, may transmit and receive multiple PDCCH "streams" (corresponding to multiple UEs) that may be multiplexed by the base station over the same set of time-frequency resources of the second subset of MIMO REGs 325, thus providing MU-MIMO for PDCCH transmissions. In the example of FIG. 3, some of the PDCCH candidates that are defined for legacy PDCCH transmissions may be designated for MIMO transmissions. In such cases, backward compatibility may be maintained, as non-MIMO capable UEs may continue to attempt to receive PDCCH transmissions in accordance with established techniques. In such cases, UEs that are capable of receiving MIMO downlink control channel transmissions may identify MIMO downlink control transmission entities that correspond to legacy PDCCH candidates, that are designated for MIMO downlink transmissions.

Figure 5:
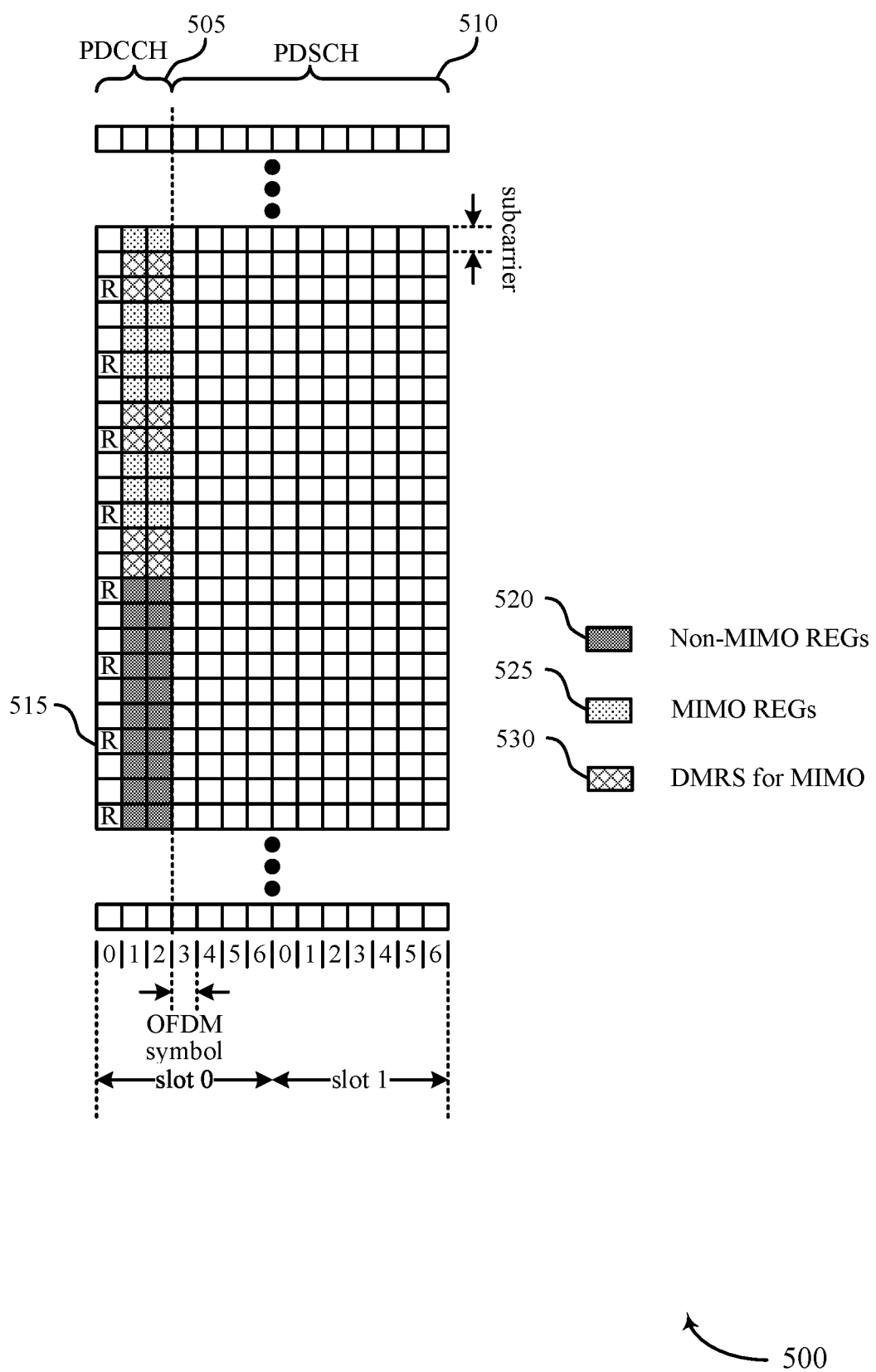
FIG. 5 illustrates an example of downlink resources that support multi-user control channel transmission techniques in accordance with aspects of the present disclosure.

In some cases, as will be discussed in more detail herein with respect to FIG. 5, MIMO downlink control channel transmissions may include a UE-RS that may be used by a UE for receiving the MIMO PDCCH transmissions. In other cases, such as illustrated in FIG. 3, a reference signal (e.g., a CRS) 315 that is periodically transmitted in PDCCH resources 305 may be used for receiving PDCCH transmissions. In some cases a UE may blind decode across a number of specified precoders to receive precoded PDCCH transmissions (e.g., MIMO PDCCH). For example, the UE may apply a first precoding candidate to the CRS and attempt to decode a control channel candidate using the channel estimation provided by applying the precoding candidate to the CRS. If the decoding is successful, the downlink control information may be extracted for use in communications with the base station. If the decoding is unsuccessful using the first precoding candidate, as second precoding candidate may be applied to the CRS for channel estimation and the decoding operation repeated on the control channel candidate. The procedure may be repeated until the control channel candidate is successfully decoded, or until all precoding candidates have been applied across all control channel candidates (e.g., across a search space). In some cases, the base station may select one or more certain precoders from a specified list of possible precoders, to encode the multiple PDCCH streams, corresponding to different UEs, for transmission over the time-frequency resources mapped to the designated MIMO PDCCH entities, which may be mapped to MIMO REGs 325. In some cases, MIMO PDCCH entities may have nine contiguous or non-contiguous REGs, similarly as non-MIMO PDCCH candidates.

In some cases, different precoders may be chosen by the base station within different time-frequency resources mapped to the designated MIMO PDCCH entities. A MIMO capable UE may blindly decode a particular MIMO PDCCH entity across the different MIMO precoders employed by the base station. In some cases, the designated MIMO PDCCH entities may be specified such that the time and frequency of the overall mapped resources (e.g., within the LTE resource grid) are in relatively close proximity, which may help to provide a fewer number of precoders to encode the MIMO PDCCH transmissions. In some cases, the UEs may measure CSI (e.g., based on a CSI reference signal transmitted by the base station), and transmit a CSI measurement report to the base station. The CSI measurement report may include CSI feedback such as a precoding matrix indicator (PMI), and the different precoders (i.e., a set of precoding candidates) may be based on the latest reported CSI feedback. In some cases, when a UE reports PMI in a CSI measurement report, the UE may use the latest reported PMI (or set of PMIs for subband precoding) as an initial precoding candidate for MIMO PDCCH transmissions. In some cases, if the initial blind decode based on the initial precoding candidate is unsuccessful, one or more other precoding candidates of the set of precoding candidates.

In some cases, a UE may monitor the MIMO PDCCH entities, and also the first subset of PDCCH candidates (e.g., with transmit diversity based PDCCH) for PDCCH transmission. In some examples, for common search space, all PDCCH monitoring is of legacy PDCCH candidates, and for UE-specific search space, all PDCCH monitoring is of MIMO PDCCH entities that are precoded when transmitted by the base station. In other examples, for UE specific search space, some PDCCH monitoring may be of MIMO PDCCH entities and other PDCCH monitoring may be of legacy PDCCH candidates.

In further examples, for UE specific search space, the PDCCH monitoring may be based on a downlink control information (DCI) (e.g., as indicated in a PCFICH). For example, if DCI format 0/1A is indicated, PDCCH monitoring may be of legacy PDCCH candidates, and if a transmit-mode (TM) specific DCI is indicated (e.g., TM 8 or TM 9) PDCCH monitoring may be for precoded MIMO PDCCH transmissions. In some cases, all PDCCH transmissions are rate-matched around resources that are used for PCFICH transmissions and PHICH transmissions.

In some cases, a base station may configure the MIMO REGs 325 and the MIMO PDCCH monitoring entities based on determining that one or more served UEs are MIMO capable UEs. In some cases, MIMO capable UEs may transmit an explicit indication to the base station of MIMO capability. In other cases, a base station may determine that a UE is MIMO capable based on an implicit indication from the UE (e.g., based on a UE category or one or more other capabilities indicated by the UE). In some cases, whether the base station transmits a MIMO PDCCH to a MIMO PDCCH capable UE may be implicitly signaled by the number of CRS ports configured by the base station (e.g., greater than one configured CRS port may indicate to a capable UE that it should expect MIMO PDCCH in the designated MIMO REGs 325 resources). In some cases, the MIMO PDCCH entities or time-frequency resources may be cell ID specific, which may aid in mitigating inter-cell interference for PDCCH among the MIMO PDCCH entities or time-frequency resources. Additionally or alternatively, only one UE may be scheduled to receive PDCCH on designated MIMO PDCCH resources, which may facilitate a SU-MIMO PDCCH transmission, which may follow similar precoding techniques as described for the MU-MIMO case, but with SU-MIMO precoders. In some cases, rank-1 beamforming may be used when only one UE may be scheduled to receive PDCCH on designated MIMO PDCCH resources.

Figure 4:
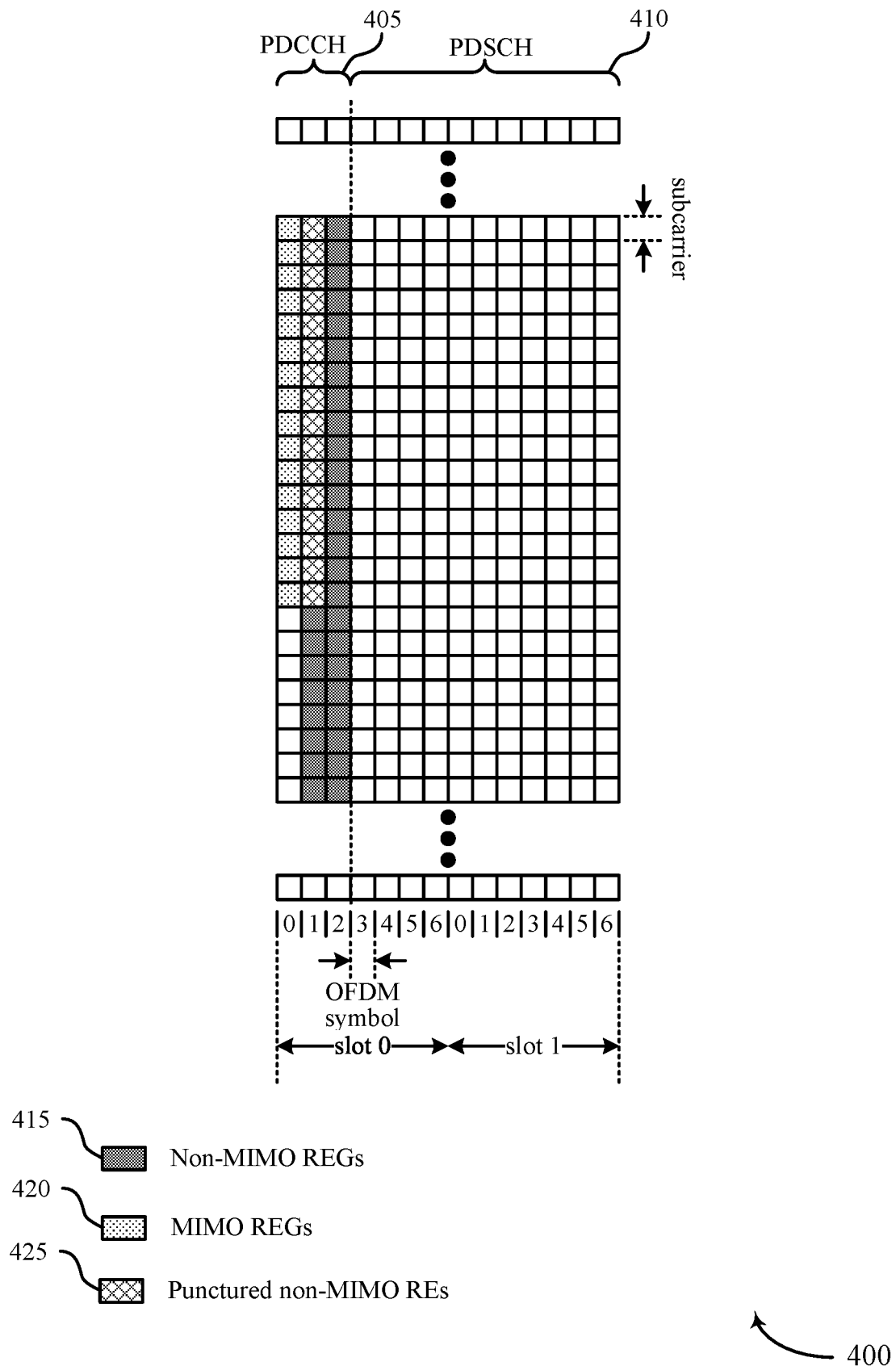
FIG. 4 illustrates an example of downlink resources that support multi-user control channel transmission techniques in accordance with aspects of the present disclosure.

As described herein, in some cases MIMO PDCCH resources may be defined separately of legacy PDCCH candidates. FIG. 4 illustrates an example of downlink resources 400 with separately configured MIMO PDCCH resources that support multi-user control channel transmission techniques in accordance with aspects of the present disclosure. In some examples, downlink resources 400 may implement aspects of wireless communications system 100. In this example, PDCCH resources 405 and PDSCH resources 410 may be configured according to a resource grid, with non-MIMO REGs 415 and separately configured MIMO REGs 420. In some cases, the MIMO REGs 420 may be allocated and MIMO PDCCH entities defined separately and independently of legacy PDCCH candidates. In some cases, some REs non-MIMO REGs may be punctured by MIMO REGs 420, as indicated at punctured REs 425 in FIG. 4.

In some cases, the MIMO PDCCH resources may be selected based in part upon proximity of the resources. As discussed herein, while contiguous resources are illustrated for different REGs, various other examples may have non-contiguous resources mapped to PDCCH transmissions. In such cases, MIMO PDCCH resources may be selected such that multiple MIMO PDCCH transmissions may use a same UE-RS or DMRS, or to minimize the number of different precoders required for blind decode operations. In some cases, the MIMO PDCCH resources may be selected so as to minimize the number of legacy PDCCH candidates and non-MIMO REGs 415 that overlap with MIMO REGs 420. In some cases, the MIMO PDCCH resources may be selected so as to affect up to a certain fraction of resources in a number of legacy PDCCH candidates that overlap with the MIMO PDCCH resources.

As described herein, in some cases MIMO PDCCH transmissions may be transmitted with UE-RSs or DMRSs, which may avoid a UE having to perform blind decoding on MIMO PDCCH transmissions. FIG. 5 illustrates an example of downlink resources 500 with DMRS resources that support multi-user control channel transmission techniques in accordance with aspects of the present disclosure. In some examples, downlink resources 500 may implement aspects of wireless communications system 100. In this example, PDCCH resources 505 and PDSCH resources 510 may be configured according to a resource grid, with non-MIMO REGs 515 and separately configured MIMO REGs 520. In some cases, the MIMO REGs 520 may have allocated DMRS resources 530. The DMRS resources 530 may be in addition to other reference signal resources 515, such as CRS resources.

In such cases, a base station may embed an appropriate number of DMRSs within the time-frequency resources spanned by designated MIMO PDCCH entities. The base station may then precode the multiple PDCCH streams intended for different UEs for transmission over the time-frequency resources mapped to the designated PDCCH entities. In such cases, since DMRS transmissions are employed, the base station may not explicitly signal the precoder(s) employed. In some cases, the designated MIMO REGs 525 and MIMO PDCCH entities may be specified such that the time and frequency proximity of the overall mapped resources (within the LTE resource grid) have relatively close proximity, which may provide relatively lower overhead for UE-RS or DMRS signals.

In some cases, a combination of DMRS-based MIMO PDCCH transmissions and CRS-based MIMO PDCCH transmissions may be used. In such cases, whether DMRS-based or CRS-based MIMO PDCCH transmissions are used may depend on the number of UEs multiplexed in MIMO PDCCH in a certain time-frequency resources. For example, for two or four UEs being multiplexed over the MIMO PDCCH resource, CRS based schemes (in conjunction with blind decoding/PMI-based decoding across candidate precoders) such as discussed with respect to FIG. 3 may be employed, while for greater than two or four UEs being multiplexed over MIMO PDCCH resources, DMRS-based schemes such as illustrated in FIG. 5 may be employed.

As described herein, in some cases, only one UE may be scheduled to receive PDCCH via designated MIMO PDCCH resources, and some cases such a PDCCH transmission may be transmitted via a MIMO PDCCH entity using precoding corresponding to (e.g., a rank-1) beamformed transmission. Such techniques may help to enhance capacity and performance of PDCCH transmissions.

In some cases, MIMO PDCCH transmissions may be enabled by a base station based on various conditions present at the base station (e.g., number of UEs served, channel conditions, etc.). In some cases, a base station may signal that MIMO PDCCH is enabled based on a number of control symbols configured for PDCCH, which may be indicated in the PCFICH. For example, whether MU-MIMO, SU-MIMO, rank-1 beamforming, or combinations thereof will be enabled for PDCCH may depend (and may be implicitly signaled) by the number of control symbols configured (e.g., one, two, or three symbols). In some examples, the number of control symbols configured may determine whether UE-RS-based approaches or blind-decoding based approaches are employed. For example, if only 1 control symbol is configured this may indicate (e.g., implicitly) that only blind decoding based precoding solutions may be enabled, to minimize signaling overhead requirements. Thus, the use of 1 control symbol may indicate that there may be precoded resources of the PDCCH (e.g., to a MU-MIMO capable device). In another example, if 2 or 3 control symbols are configured, there may be UE-RS based as well as blind decoding based solutions feasible (e.g., in dedicated resources for each, or signaled by higher layers appropriately). In some cases, designated MIMO PDCCH entities to be monitored by a UE may be predefined, and in some cases, may be cell ID specific. In some cases, designated MIMO PDCCH entities to be monitored by a UE may be configured by higher layer signaling, and indicated to a UE via RRC signaling or via DCI that is transmitted prior to an initial MIMO PDCCH transmission.

In some cases, the MIMO PDCCH entities that are to be monitored for MIMO PDCCH transmissions may be based on an aggregation level of the PDCCH transmissions. For example, more MIMO PDCCH transmissions may be provided in cases where with lower aggregation levels (e.g., L=1, 2) are be assigned for MU-MIMO PDCCH, while preferentially more legacy PDCCH candidates may be provided in cases where higher aggregation levels (e.g., L=4, 8) are assigned for PDCCH. Such examples may provide that larger aggregation candidates may be provided in reliability-limited conditions, where reliability may be more important than increasing capacity.

In some cases, MIMO PDCCH-specific information may be signaled in one or more dedicated DCI format(s). Such DCI may be transmitted in a PDCCH transmission before MIMO transmission is configured, or a certain number of subframes in advance of MIMO PDCCH transmissions. In some cases, the dedicated DCI format(s) may indicate, for example, whether MU-MIMO, SU-MIMO, beamforming, or combinations thereof, will be enabled for PDCCH, and from which subframe such transmissions start; whether a UE-RS based approach is employed or blind decoding-based approach is employed for monitoring and receive MIMO PDCCH transmissions, information on possible precoding candidate sets; information on which resources may dedicated for MU-MIMO PDCCH transmissions, or combinations thereof.

Figure 6:
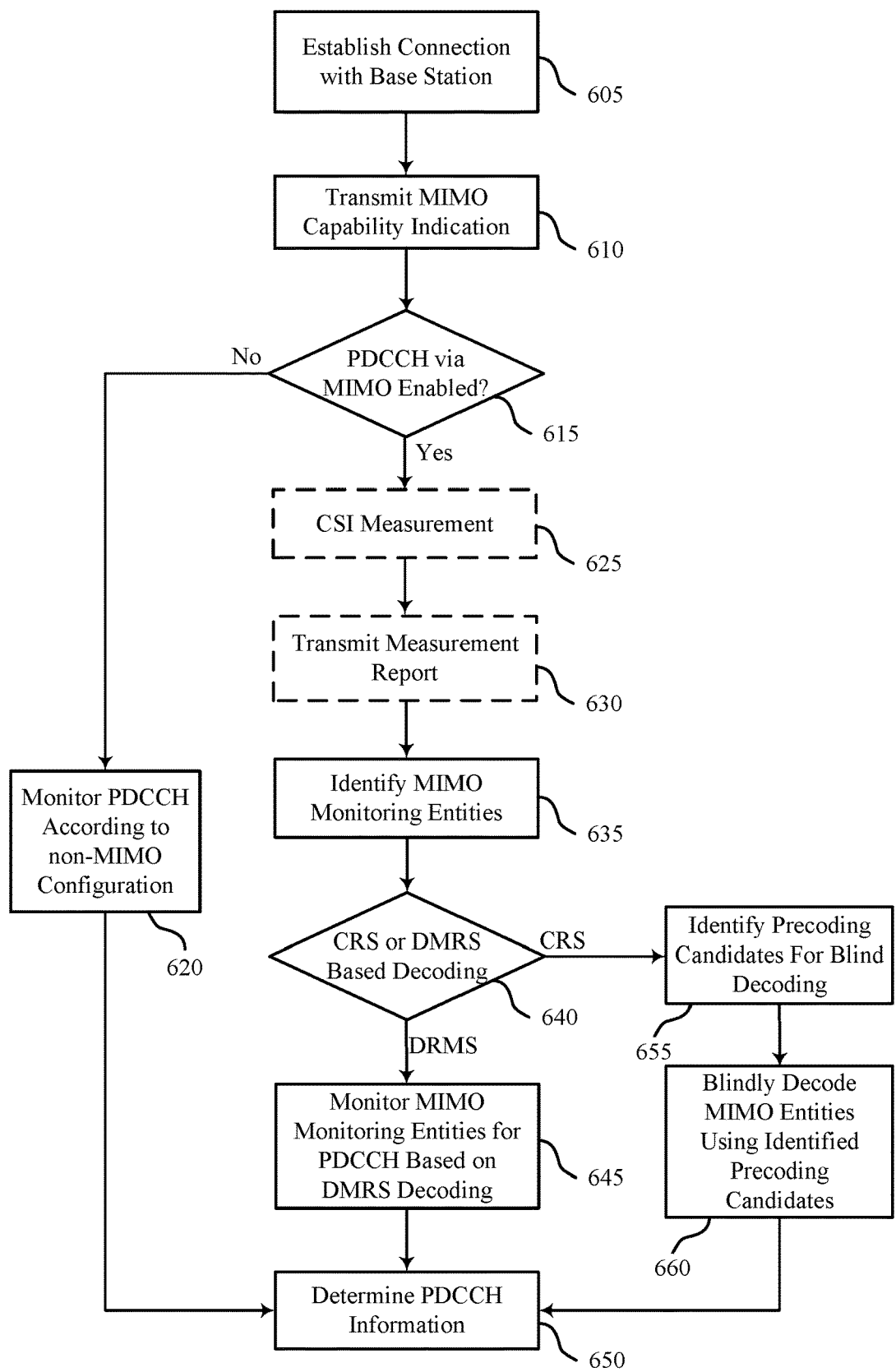
FIG. 6 illustrates an example of a method that supports multi-user control channel transmission techniques in accordance with aspects of the present disclosure.

FIG. 6 illustrates an example of a method 600 that supports multi-user control channel transmission techniques in accordance with aspects of the present disclosure. In some examples, method 600 may implement aspects of wireless communications system 100. In some cases, the method 600 may be performed by a UE that is capable of receiving MIMO PDCCH transmissions.

At 605, the UE may establish a connection with a base station. Such a connection establishment may be completed according to established connection establishment procedures (e.g., connection establishment procedures defined for LTE or NR systems). For example, the UE may transmit a random access request, to initiate a connection establishment with the base station.

At 610, the UE may transmit a MIMO capability indication to the base station. In some cases, the MIMO capability indication may be an explicit indication that is provided in RRC signaling as part of the connection establishment with the base station. In other cases, the MIMO capability indication may be provided after connection establishment, such as in response to a request for such information that is received from the base station. In some cases, the MIMO capability indication may be provided implicitly to the base station, such as in a UE category, a capability indication, or an indication of a type of services that may be supported by the UE.

At 615, it may be determined whether PDCCH via precoded transmissions is enabled. Such a determination may be made based on, for example, a DCI format that is indicated in a PCFICH transmission. In some cases, such a determination may be made based on a number of CRS ports that are configured by the base station. In other cases, such a determination may be made based on an explicit indication provided in DCI of one or more earlier PDCCH transmissions from the base station, which may indicate precoded PDCCH resources that correspond to a number of precoded PDCCH monitoring candidates that are to be monitored by the UE for MIMO PDCCH transmissions.

If it is determined at 615 that PDCCH via precoding is not enabled, the UE may, at 620, monitor PDCCH according to non-precoded (e.g., non-MIMO) configurations. For example, the UE may monitor legacy PDCCH candidates for PDCCH transmissions in a common search space and a UE-specific search space.

If it is determined at 615 that precoding is enabled for PDCCH, the UE may perform one or more of various techniques as discussed herein to identify and receive precoded PDCCH transmissions. At 625, the UE may optionally perform a CSI measurement. Such a CSI measurement may be based on a CSI reference signal that is transmitted by the base station. As part of the CSI measurement, the UE may measure one or more channel characteristics of a downlink channel of the base station, which may indicate a precoding that is to be used for subsequent transmissions to the UE, for example.

At 630, in cases where the UE measures CSI, the UE may optionally transmit a measurement report to the base station. Such a measurement report may include various measurement information, which may include a PMI that is selected by the UE. The measurement report may be transmitted in uplink resources that are allocated for uplink transmissions of measurement reports, such as in a physical uplink shared channel (PUSCH) transmission with resources allocated to the UE. In some cases, the measurement report may be generated based on an aperiodic CSI request from the base station, using resources that are indicated in the trigger for the aperiodic CSI report.

At 635, the UE may identify precoded monitoring candidates. The precoded monitoring candidates may include a number of REGs that are configured to contain precoded PDCCH transmissions from the base station. In some cases, precoded monitoring candidates may correspond to a number of REGs that are configured for legacy PDCCH candidates, and may be a subset of legacy PDCCH candidates. In some cases, precoded monitoring candidates may correspond to PDCCH resources that are configured separately from legacy PDCCH candidates (e.g., in a separate CORESET or search space), and which may in some cases puncture a portion of the resources of legacy PDCCH candidates.

At 640, the UE may determine whether CRS or DMRS based decoding is to be used for precoded PDCCH transmissions. In some cases, such a determination may be based on a predefined MIMO PDCCH configuration. In some cases, the base station may signal that precoding is enabled for PDCCH based on a number of control symbols configured for PDCCH (e.g., via a PCFICH transmission). In some cases, the number of control symbols configured may determine whether UE-RS-based approaches or blind-decoding based approaches are employed. For example, if only 1 control symbol is configured, only blind decoding based precoding solutions may be enabled, to minimize signaling overhead requirements, while if 2 or 3 control symbols are configured, there may be UE-RS based as well as blind decoding based solutions feasible (e.g., in dedicated resources for each, or signaled by higher layers appropriately).

If the UE determines at 640 that DMRS-based decoding is to be employed, monitoring may be performed at 645 for precoded monitoring candidates based on DMRS decoding. In some cases, the DMRS that is included with the precoded PDCCH transmission may use a same precoding as the PDCCH transmission, and thus separate signaling of the precoding, or blind decoding based on a set of precoding candidates, may not be needed.

At 650, the UE may determine PDCCH information based on decoding a PDCCH transmission in accordance with the PDCCH monitoring at 645, or based on the non-precoded PDCCH monitoring at 620. In some cases, the PDCCH information may be decoded based on a DCI format that was indicated in a PCFICH transmission.

If the UE determines at 640 that CRS-based decoding applies to precoded PDCCH transmissions, the UE may, at 655, identify precoding candidates for blind decoding. In some cases, if a CSI measurement report is transmitted, the UE may identify a precoding candidate based on the latest reported CSI feedback. In some cases, when the UE reports PMI in a CSI measurement report, the UE may use the latest reported PMI (or set of PMIs for subband precoding) as initial precoding candidate(s) for precoded PDCCH transmissions. In some cases, if the initial blind decode based on the initial precoding candidate is unsuccessful, one or more other precoding candidates of the set of precoding candidates may be selected for a subsequent blind decoding attempt.

At 660, the UE may blindly decode precoded monitoring candidates using the identified precoding candidates. In some cases, an initial precoding candidate may be identified, and decoding attempted. In the event that the decoding is unsuccessful, the UE may attempt to decode the precoded monitoring candidate using another precoding candidate.

Figure 7:
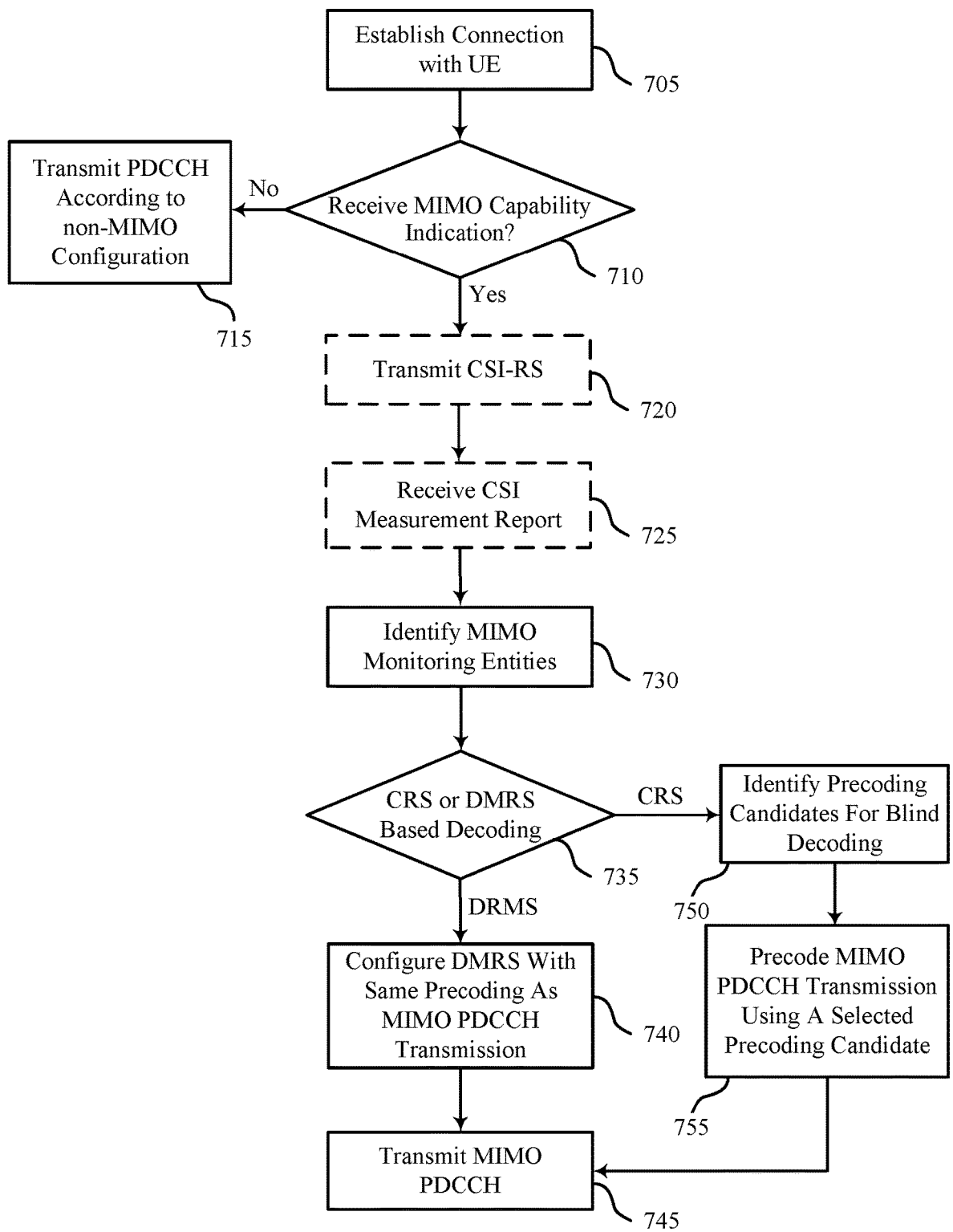
FIG. 7 illustrates an example of a method that supports multi-user control channel transmission techniques in accordance with aspects of the present disclosure.

FIG. 7 illustrates an example of a method 700 that supports multi-user control channel transmission techniques in accordance with aspects of the present disclosure. In some examples, method 700 may implement aspects of wireless communications system 100. In some cases, the method 700 may be performed by a base station that is capable of transmitting precoded PDCCH transmissions to capable UEs.

At 705, the base station may establish a connection with a UE. Such a connection establishment may be completed according to established connection establishment procedures (e.g., connection establishment procedures defined for LTE or NR systems). For example, the UE may transmit a random access request, to initiate a connection establishment with the base station.

At 710, the base station may determine whether the UE is capable of receiving precoded PDCCH transmissions. In some cases, the UE may transmit a MIMO capability indication to the base station. In some cases, the MIMO capability indication may be an explicit indication that is provided in RRC signaling as part of the connection establishment with the base station. In other cases, the MIMO capability indication may be provided after connection establishment, such as in response to a request for such information that is received from the base station. In some cases, the MIMO capability indication may be provided implicitly to the base station, such as in a UE category, a capability indication, or an indication of a type of services that may be supported by the UE.

If it is determined at 710 that the UE is not capable of receiving precoded PDCCH transmissions, the base station may, at 715, transmit PDCCH transmissions according to a non-precoded PDCCH configuration. In some cases, the non-precoded PDCCH configuration may provide PDCCH transmissions in legacy PDCCH candidates, which may be received by both UEs that are capable of receiving precoded PDCCH transmissions, and UEs that are not capable of receiving precoded PDCCH transmissions.

If it is determined at 710 that the UE is capable of receiving precoded PDCCH transmissions, the base station may optionally, at 720, transmit a CSI reference signal (CSI-RS). In some cases, the CSI-RS may be transmitted with a trigger to the UE to perform an aperiodic CSI measurement, and that may also provide uplink resources for an aperiodic CSI measurement report. In other cases, the CSI-RS may be a regularly scheduled CSI-RS.

At 725, the base station may optionally receive a CSI measurement report. Such a measurement report may include various measurement information, which may include a PMI that is selected by the UE. The measurement report may be transmitted in uplink resources that are allocated for uplink transmissions of measurement reports, such as in a PUSCH transmission with resources allocated to the UE. In some cases, the measurement report may be generated based on an aperiodic CSI request from the base station, using resources that are indicated in the trigger for the aperiodic CSI report. In some cases, a set of available precoding candidates may be selected based on the PMI-indicated precoder itself, or a subset of precoders having similar performance to the indicated PMI to effectively result in a pruned down subset from the larger predefined set of precoders, or, the UE may have a formula/table based on its reported PMI for the precoding candidates it will blindly decode over and the base station uses one of those precoding candidates per the reported PMI.

At 730, the base station may identify precoded monitoring candidates for precoded PDCCH transmissions. The precoded monitoring candidates may include a number of REGs that are configured to contain precoded PDCCH transmissions from the base station. In some cases, precoded monitoring candidates may correspond to a number of REGs that are configured for legacy PDCCH candidates, and may be a subset of legacy PDCCH candidates. In some cases, precoded monitoring candidates may correspond to PDCCH resources that are configured separately from legacy PDCCH candidates, and which may in some cases puncture a portion of the resources of legacy PDCCH candidates.

At 735, the base station may determine whether CRS or DMRS based decoding is to be used for precoded PDCCH transmissions. In some cases, such a determination may be based on a predefined MIMO PDCCH configuration. In some cases, the base station may signal that precoding of PDCCH is enabled based on a number of control symbols configured for PDCCH (e.g., via a PCFICH transmission). In some cases, the number of control symbols configured may determine whether UE-RS-based approaches or blind-decoding based approaches are employed. For example, if only 1 control symbol is configured, only blind decoding based precoding solutions may be enabled, to minimize signaling overhead requirements, while if 2 or 3 control symbols are configured, there may be UE-RS based as well as blind decoding based solutions feasible (e.g., in dedicated resources for each, or signaled by higher layers appropriately).

If the base station determines at 735 that DMRS-based decoding is to be employed, the base station may, at 740, configure a DMRS with a same precoding that is used for the precoded PDCCH transmission for the UE. Thus separate signaling of the precoding, or blind decoding based on a set of precoding candidates, may not be needed.

At 745, the base station may transmit precoded PDCCH transmissions to the UE. In some cases, the precoded PDCCH transmission may be transmitted in accordance with the DMRS that is transmitted in DMRS resources.

If the base station determines at 735 that CRS-based decoding is to be used for precoded PDCCH transmissions, the base station may, at 750, identify precoding candidates for blind decoding. In some cases, if a CSI measurement report is transmitted, the UE may identify a precoding candidate based on the latest reported CSI feedback. In some cases, when the UE reports PMI in a CSI measurement report, the base station may select the latest reported PMI (or set of PMIs for subband precoding) for precoding of the precoded PDCCH transmission.

At 755, the base station may precode the precoded PDCCH transmission using the selected precoding candidate. At 745, the base station may transmit the precoded PDCCH transmission based on the selected precoding that is applied to the PDCCH transmission.

Figure 8:
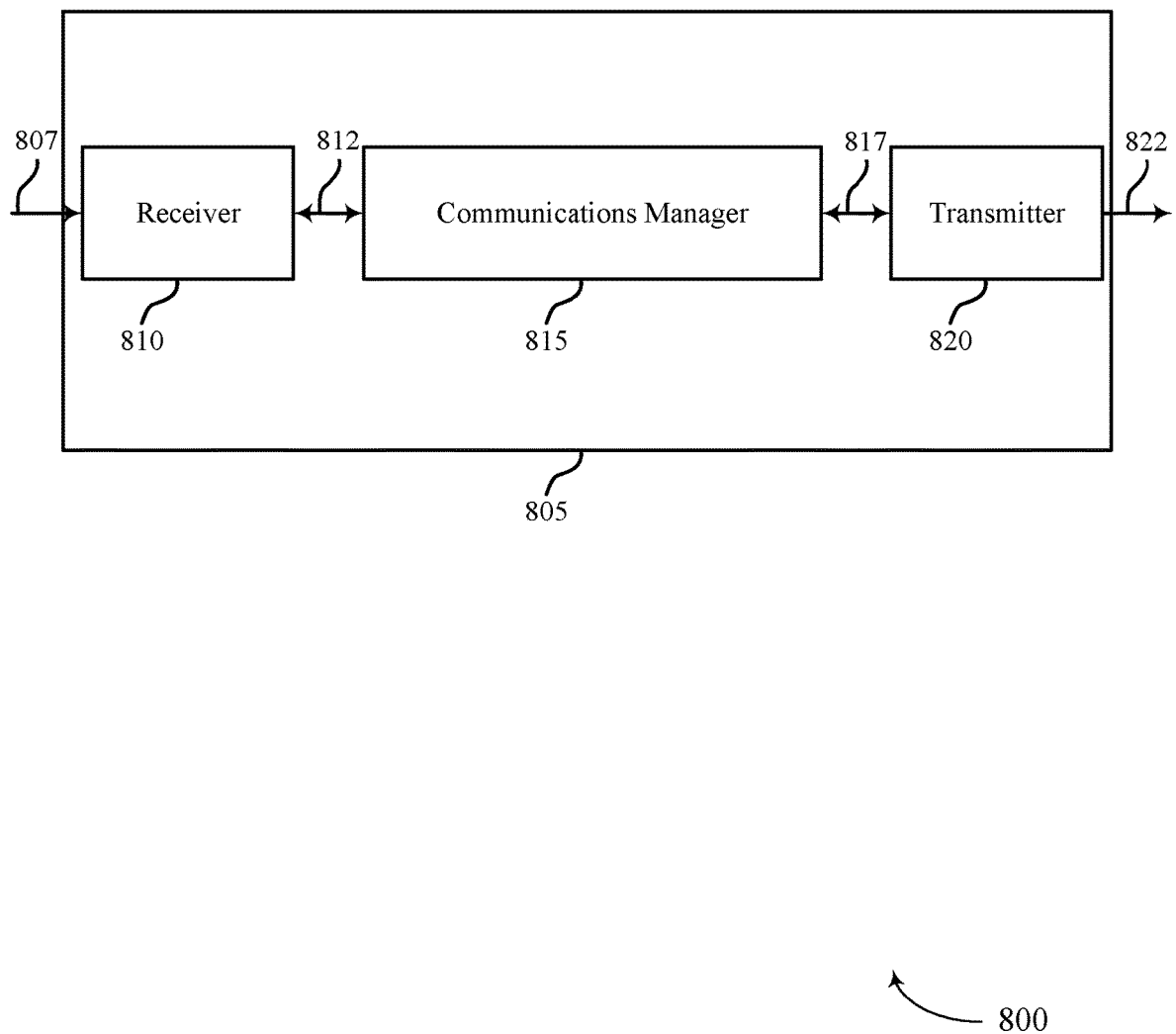
FIGS. 8 and 9 show block diagrams of devices that support multi-user control channel transmission techniques in accordance with aspects of the present disclosure.

FIG. 8 shows a block diagram 800 of a device 805 that supports multi-user control channel transmission techniques in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive signaling 807 via one or more antennas and may perform various operations to process the signaling (e.g., down-conversion, analog-todigital (ADC) conversion, filtering, baseband processing, etc.) This information may be passed on to other components of the device.

The receiver 810 may receive information such as packets, user data, or control information associated with various information channels (e.g., control channels, data channels, and information related to multi-user control channel transmission techniques, etc.) via signaling 807. Information may be passed on to other components of the device 805. The receiver 810 may be an example of aspects of the transceiver 1120 described with reference to FIG. 11. The receiver 810 may utilize a single antenna or a set of antennas. The receiver 810 may transmit signaling 812 to communications manager 815.

The communications manager 815 may receive information via signaling 812 from receiver 810. The communications manager 815 may transmit, from a UE, an indication that the UE is capable of supporting multiple-input multiple-output (MIMO) for receiving downlink control channel communications, monitor, based on the transmission of the indication, a first subset of a set of downlink control channel resources for downlink control channel information from a base station, the first subset of downlink control channel resources having MIMO downlink control channel information transmissions, and communicate with the base station based on downlink control channel information received from the base station via the first subset of downlink control channel resources. The actions performed by the communications manager 815 as described herein may be implemented to realize one or more potential advantages. One implementation may allow a UE 115 to reduce latency and signaling overhead by increasing the usable capacity of control channels over previous non-precoded common or UE-specific control channels. The communications manager 815 may be an example of aspects of the communications manager 1110 described herein. The communications manager 815 may transmit signaling 817 to transmitter 820 in order to transmit the indication.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals 822 generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Based on determining at least one precoding of downlink control channel information to be blindly decoded based on the recipient, a processor of a UE 115 (e.g., controlling the receiver 810, the transmitter 840, or the transceiver 1120 as described with reference to FIG. 11) may efficiently determine that a portion of the precoded control channel resources are for UE 115. Where precoded control channel resources may be the present in a control channel that may include different control channel resources for different receiving devices.

Figure 9:
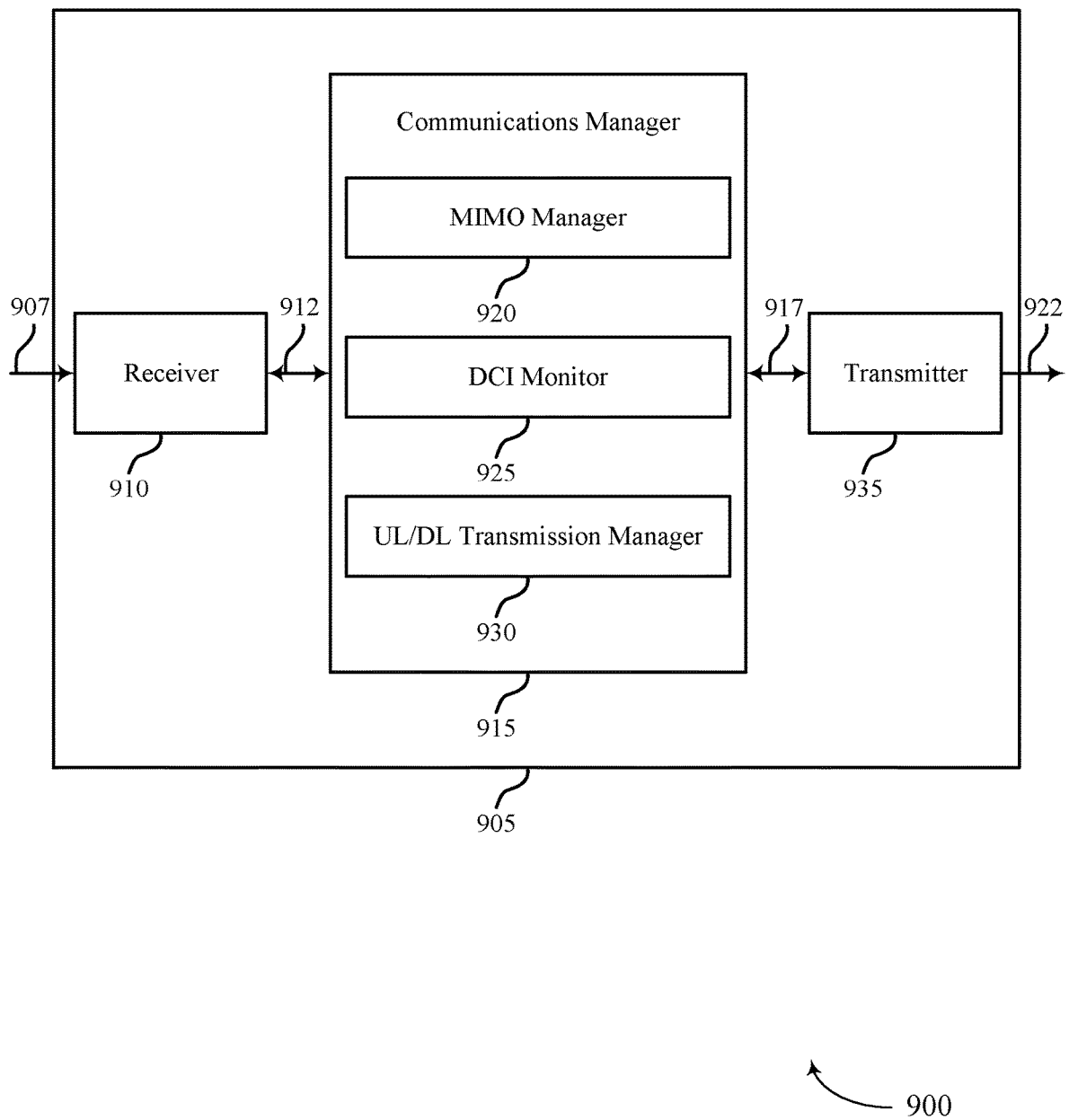

FIG. 9 shows a block diagram 900 of a device 905 that supports multi-user control channel transmission techniques in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive signaling 907 via one or more antennas and may perform various operations to process the signaling (e.g., down-conversion, analog-to-digital (ADC) conversion, filtering, baseband processing, etc.) This information may be passed on to other components of the device.

The receiver 910 may receive information such as packets, user data, or control information associated with various information channels (e.g., control channels, data channels, and information related to multi-user control channel transmission techniques, etc.) via signaling 907. Information may be passed on to other components of the device 905. The receiver 910 may be an example of aspects of the transceiver 1120 described with reference to FIG. 11. The receiver 910 may utilize a single antenna or a set of antennas. The receiver 910 may transmit signaling 912 to communications manager 915.

The communications manager 915 may receive information via signaling 912 from receiver 910. The communications manager 915 may be an example of aspects of the communications manager 815 as described herein. The communications manager 915 may include a MIMO manager 920, a DCI monitor 925, and an UL/DL transmission manager 930. The communications manager 915 may be an example of aspects of the communications manager 1110 described herein. The communications manager 915 may transmit signaling 917 to transmitter 920 in order to transmit the indication.

The MIMO manager 920 may transmit, from a UE, an indication that the UE is capable of supporting multiple-input multiple-output (MIMO) for receiving downlink control channel communications.

The DCI monitor 925 may monitor, based on the transmission of the indication, a first subset of a set of downlink control channel resources for downlink control channel information from a base station, the first subset of downlink control channel resources having MIMO downlink control channel information transmissions.

The UL/DL transmission manager 930 may communicate with the base station based on downlink control channel information received from the base station via the first subset of downlink control channel resources.

The transmitter 935 may transmit signals 922 generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
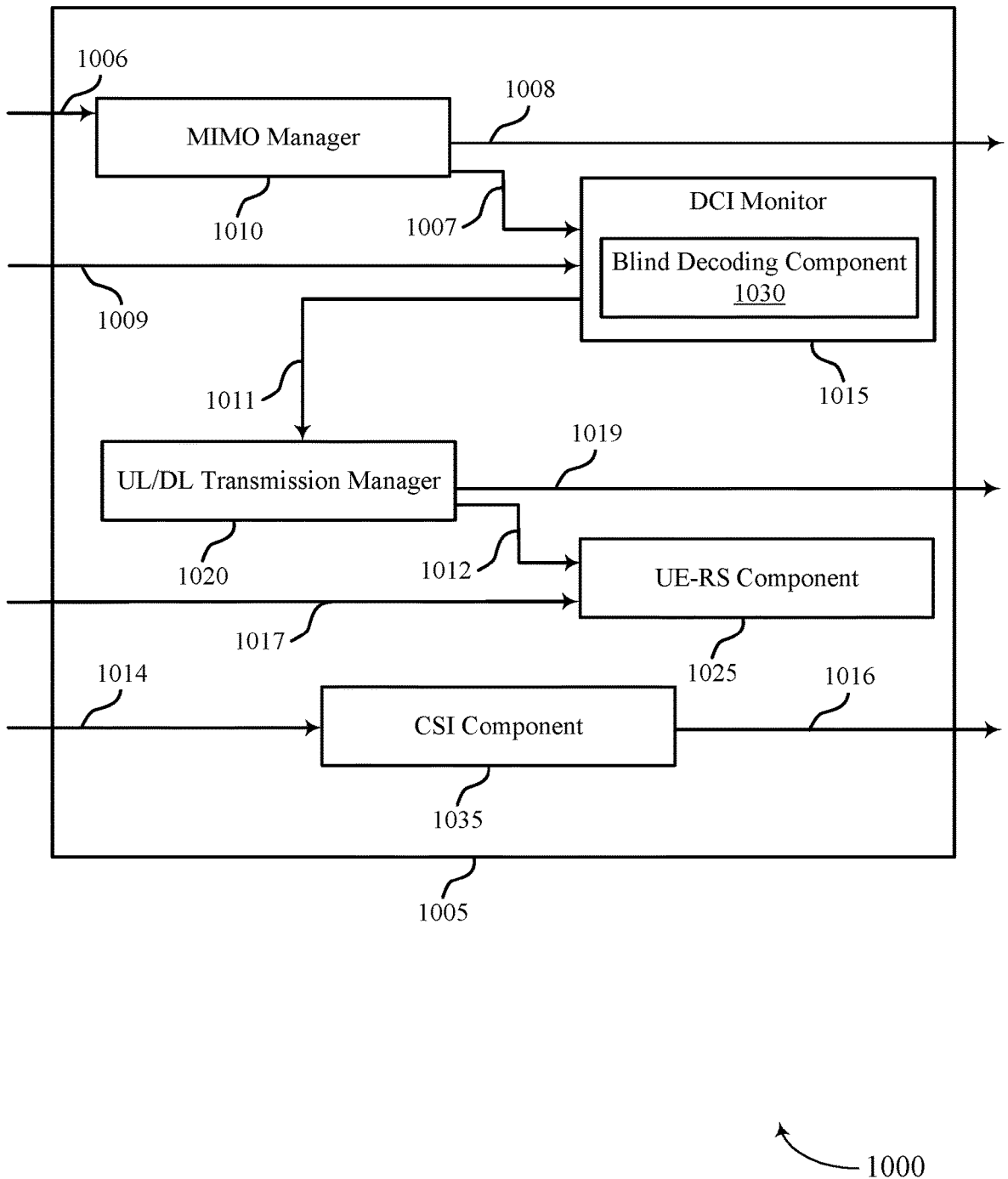
FIG. 10 shows a block diagram of a communications manager that supports multi-user control channel transmission techniques in accordance with aspects of the present disclosure.

FIG. 10 shows a block diagram 1000 of a communications manager 1005 that supports multi-user control channel transmission techniques in accordance with aspects of the present disclosure. The communications manager 1005 may be an example of aspects of a communications manager 815, a communications manager 915, or a communications manager 1110 described herein. The communications manager 1005 may include a MIMO manager 1010, a DCI monitor 1015, an UL/DL transmission manager 1020, an UE-RS component 1025, a blind decoding component 1030, and a CSI component 1035. Each of these modules may communicate, directly or indirectly, with one another (e.g., via one or more buses).

The MIMO manager 1010 may transmit an indication 1008 to the base station that the UE is capable of supporting receiving of precoded (e.g., MIMO) downlink control channel communications. In some examples, the MIMO manager 1010 may determine a first subset of downlink control channel resources to be monitored for precoded PDCCH transmissions based on a cell ID of the base station, one or more predetermined monitoring candidates, or any combination thereof. MIMO manager 1010 may send an indication 1007 of the first subset of downlink control channel resources to be monitored for precoded PDCCH transmissions to DCI monitor 1015. In some examples, the MIMO manager 1010 may receive an indication in control information 1006 from the base station that the first subset of downlink control channel resources include precoded downlink control channel information transmissions. In some examples, the MIMO manager 1010 may receive, with control information 1006, prior to the monitoring, an initial control channel transmission from that base station that provides one or more monitoring parameters for monitoring the first subset of downlink control channel resources. In some examples, information for one or more precoding candidate sets for decoding the precoded downlink control channel transmissions may be received from the base station with control information 1006. In some examples, the information may provide one or more specific resources that are dedicated for the precoded downlink control channel transmissions. In some cases, the first subset of downlink control channel resources are non-overlapping with PCFICH resources and PHICH resources. In some cases, the set of downlink control channel resources are rate-matched around CRS resources.

In some cases, the indication 1008, transmitted from the MIMO manager 1010 to the base station, that the UE is capable of supporting precoding for receiving downlink control channel communications may be explicit or implicit. For example, the indication 1008 may be associated with a field in a message or identified by the base station based on one or more other parameters transmitted to the base station. In some cases, precoded PDCCH transmissions may be enabled based on a number of CRS ports configured for the set of downlink control channel resources. In some cases, the first subset of a set of downlink control channel resources for precoded PDCCH transmissions is identified based on a cell ID of the base station.

In some cases, an initial control channel transmission has a DCI format that is specific to precoded downlink control channel transmissions and indicates one or more of MU-MIMO, SU-MIMO, or rank-1 beamforming is enabled for the precoded downlink control channel transmissions. In some cases, the DCI format may indicate whether a UE-RS or blind decoding is to be used for decoding the precoded downlink control channel transmissions.

The DCI monitor 1015 may monitor control channel 1009, based on the transmission of the indication 1007 by MIMO manager 1010, for a first subset of a set of downlink control channel resources for downlink control channel information from a base station, the first subset of downlink control channel resources associated with precoded downlink control channel information transmissions. In some examples, the DCI monitor 1015 may determine whether to perform the monitoring of the first subset of downlink control channel resources for precoded downlink control channel information transmissions based on a number of control symbols configured for downlink control channel information transmissions. In some examples, more precoded PDCCH candidates are monitored for lower aggregation levels than are monitored for higher aggregation levels.

In some cases, the set of downlink control resources include a set of monitoring candidates for downlink control channel information, the set of monitoring candidates including a first subset of monitoring candidates for MU-MIMO downlink control channel information transmissions and a second subset of monitoring candidates for additional downlink control channel communications. In some cases, the first subset of monitoring candidates may correspond to the first subset of downlink control channel resources. In some cases, the second subset of monitoring candidates correspond to a second subset of the set of downlink control channel resources that is different than the first subset of downlink control channel resources. In some cases, the second subset of the set of downlink control channel resources is non-overlapping with the first subset of downlink control channel resources.

In some cases, the first subset of downlink control resources include a first set of monitoring candidates for precoded downlink control channel communications and a second subset of the set of downlink control resources includes a second set of monitoring candidates for non-precoded downlink control channel communications, and where the first subset of downlink control resources and the second subset of downlink control resources are separately defined. In some cases, a portion of the first subset of downlink control resources puncture the second subset of downlink control resources.

In some cases, the set of downlink control channel resources include common search space candidates that include common control information for two or more UEs, and UE-specific search space candidates that include UE-specific control information for a single UE, and where the first subset of downlink control channel resources are for transmission of the UE-specific control information. In some cases, the first subset of downlink control channel resources include at least a first UE-specific search space candidate, and at least a second UE-specific search space candidate is transmitted in a second subset of downlink control channel resources for non-precoded control channel transmissions.

In some cases, a first portion of the first subset of downlink control channel resources include UE-RS transmissions for use in decoding associated downlink control channel transmissions, and a second portion of the first subset of downlink control channel resources include precoded transmissions that are blindly decoded at the UE. In some cases, an indication of whether UE-RS transmissions or blind decoding is to be used is received in RRC signaling.

In some cases, the set of downlink control resources include a set of monitoring candidates for downlink control channel information, the set of monitoring candidates including a first subset of monitoring candidates for SU-MIMO downlink control channel information transmissions using SU-MIMO precoders and a second subset of monitoring candidates for additional downlink control channel communications. In some cases, the first subset of downlink control channel resources are precoded according to a rank-1 beamformed transmission. In some cases, the first subset of downlink control channel resources are determined based on an aggregation level for monitoring for the downlink control channel transmissions.

The DCI monitor 1015 may determine when DCI is received (e.g., based on successfully decoding a PDCCH candidate), and may pass control information 1011 extracted from the DCI to UL/DL transmission manager 1020 for use in communication.

The UL/DL transmission manager 1020 may communicate with the base station using channel 1019 based on control information 1011 received from the DCI monitor 1015, which may be received from the base station with control channel 1009.

The UE-RS component 1025 may monitor for UE-RS transmissions. In some cases, the first subset of downlink control channel resources includes UE-RS transmissions, and where the monitoring is based on the UE-RS transmissions. For example, the UL/DL transmission manager 1020 may provide an indication 1012 of UE-RS resources in a downlink control channel 1017. In some cases, the downlink control channel information transmissions in the first subset of downlink control channel resources are transmitted using the same precoding as the UE-RS transmissions. In some cases, the first subset of downlink control channel resources includes two or more sets of monitoring candidates, and where a first set of monitoring candidates are precoded using a first precoding matrix, and a second set of monitoring candidates are precoded using a second precoding matrix. In some cases, a first monitoring candidate and a second monitoring candidate of the first set of monitoring candidates share UE-RS transmissions and have a same precoding.

In some cases DCI monitor 1015 may include blind decoding component 1030. Blind decoding component 1030 may blindly decode downlink control channel transmissions in the first subset of downlink control channel resources using multiple different precoding candidates that are predefined for the downlink control channel transmissions. In some cases, a set of available precoding candidates for blind decoding are mapped to each of one or more monitoring occasions within the first subset of downlink control channel resources. In some cases, a first monitoring occasion and a second monitoring occasion of the one or more monitoring occasions have a same precoding candidate. In some cases, the blind decoding is performed based on a DCI format associated with the downlink control channel transmissions, and where downlink control channel transmissions having a first DCI format are not precoded, and downlink control channel transmissions having a second DCI format are precoded.

The CSI component 1035 may measure one or more CSI parameters based on one or more reference signals 1014 received from the base station (e.g., via one or more antennas). In some examples, the CSI component 1035 may transmit a CSI report 1016 to the base station based on the measuring. In some examples, the set of available precoding candidates for blind decoding is based on the CSI report. In some cases, the CSI report includes a PMI, and where an initial blind decoding is based on the PMI. In some cases, the set of available precoding candidates may be the PMI-indicated precoder itself, or a subset of precoders having similar performance to the indicated PMI to effectively result in a pruned down subset from the larger predefined set of precoders, or, the UE may have a formula/table based on its reported PMI for the precoding candidates it will blindly decode over and the base station uses one of those precoding candidates per the reported PMI.

Figure 11:
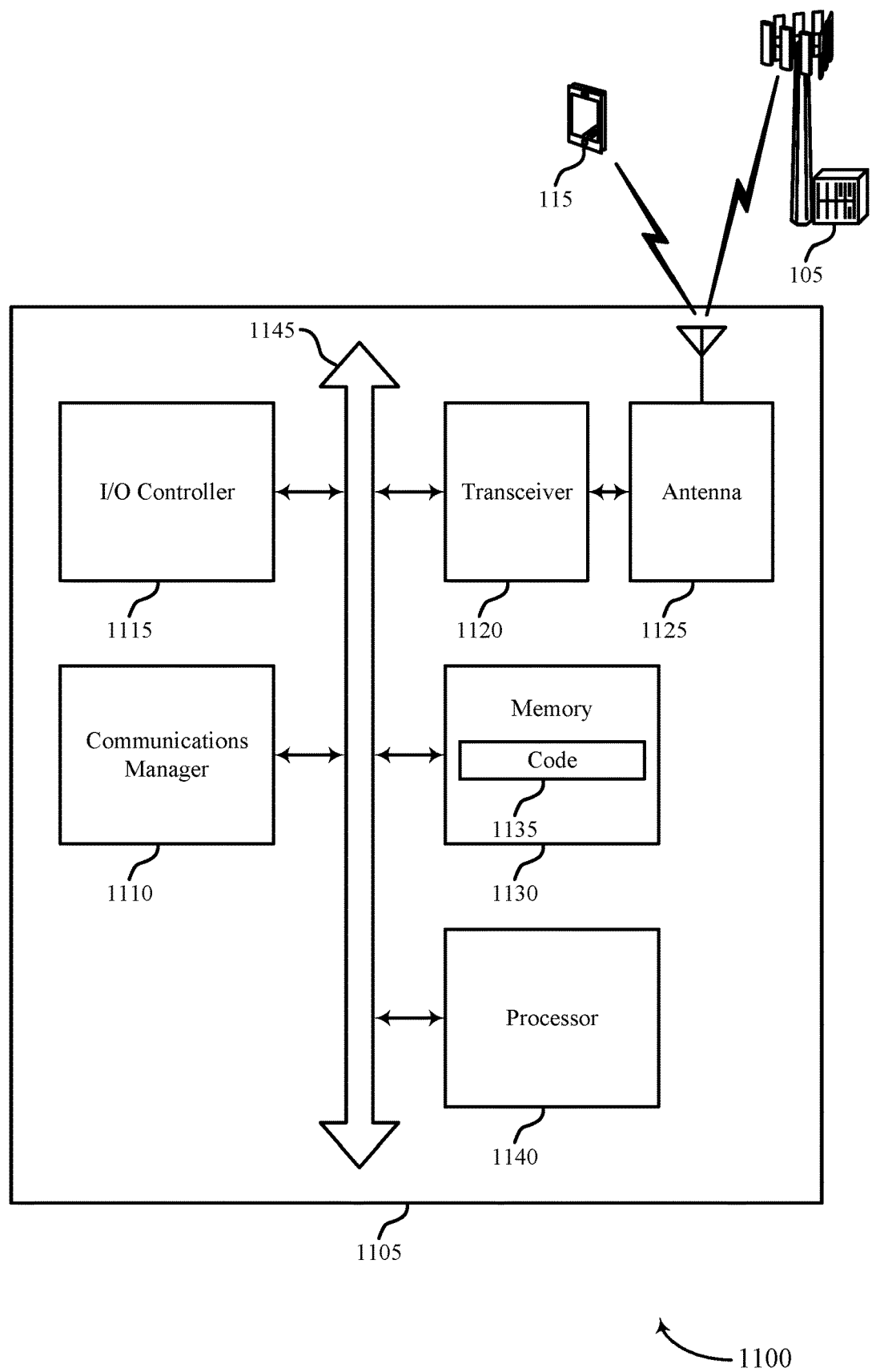
FIG. 11 shows a diagram of a system including a device that supports multi-user control channel transmission techniques in accordance with aspects of the present disclosure.

FIG. 11 shows a diagram of a system 1100 including a device 1105 that supports multi-user control channel transmission techniques in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit, from a UE, an indication that the UE is capable of supporting multiple-input multiple-output (MIMO) for receiving downlink control channel communications, monitor, based on the transmission of the indication, a first subset of a set of downlink control channel resources for downlink control channel information from a base station, the first subset of downlink control channel resources having MIMO downlink control channel information transmissions, and communicate with the base station based on downlink control channel information received from the base station via the first subset of downlink control channel resources.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multi-user control channel transmission techniques).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
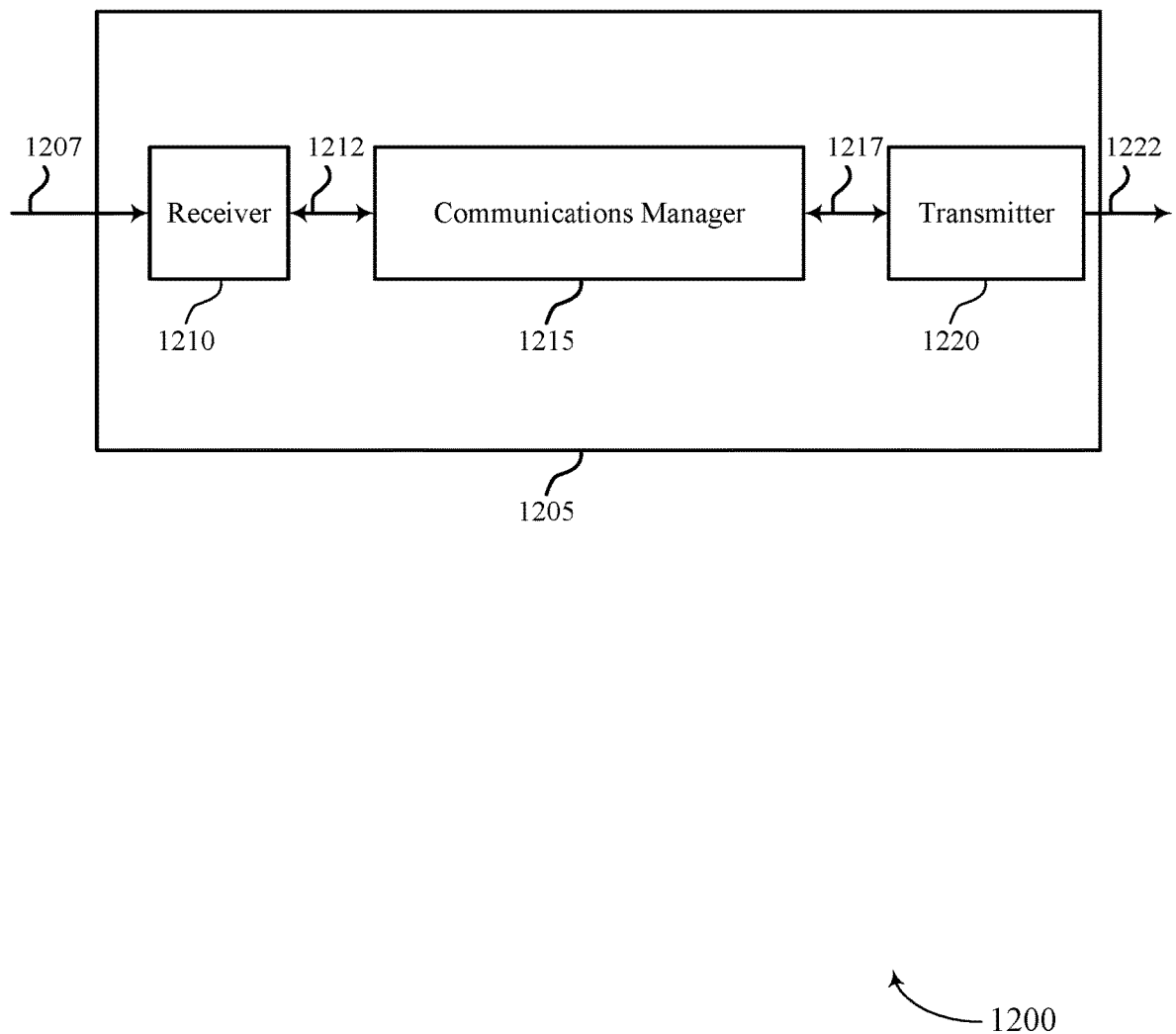
FIGS. 12 and 13 show block diagrams of devices that support multi-user control channel transmission techniques in accordance with aspects of the present disclosure.

FIG. 12 shows a block diagram 1200 of a device 1205 that supports multi-user control channel transmission techniques in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive signaling 1207 via one or more antennas and may perform various operations to process the signaling (e.g., down-conversion, analog-to-digital (ADC) conversion, filtering, baseband processing, etc.) This information may be passed on to other components of the device.

The receiver 1210 may receive information such as packets, user data, or control information associated with various information channels (e.g., control channels, data channels, and information related to multi-user control channel transmission techniques, etc.) via signaling 1207. Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive, at a base station from a UE, an indication that the UE is capable of supporting multiple-input multiple-output (MIMO) for receiving downlink control channel communications, configure, based on the indication, a first subset of a set of downlink control channel resources for downlink control channel information transmissions from the base station, the first subset of downlink control channel resources for MIMO downlink control channel information transmissions, and transmit MIMO downlink control channel transmissions to the UE via the first subset of downlink control channel resources. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure. The communications manager may receive information in signaling 1212 from receiver 1310 to perform the functions of communications manager 1215. Communications manager 1215 may transmit signaling 1217 to transmitter 1220 in order to transmit signals in the wireless communications system.

The transmitter 1220 may transmit signals via signaling 1222 using one or more antennas or an antenna array. The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
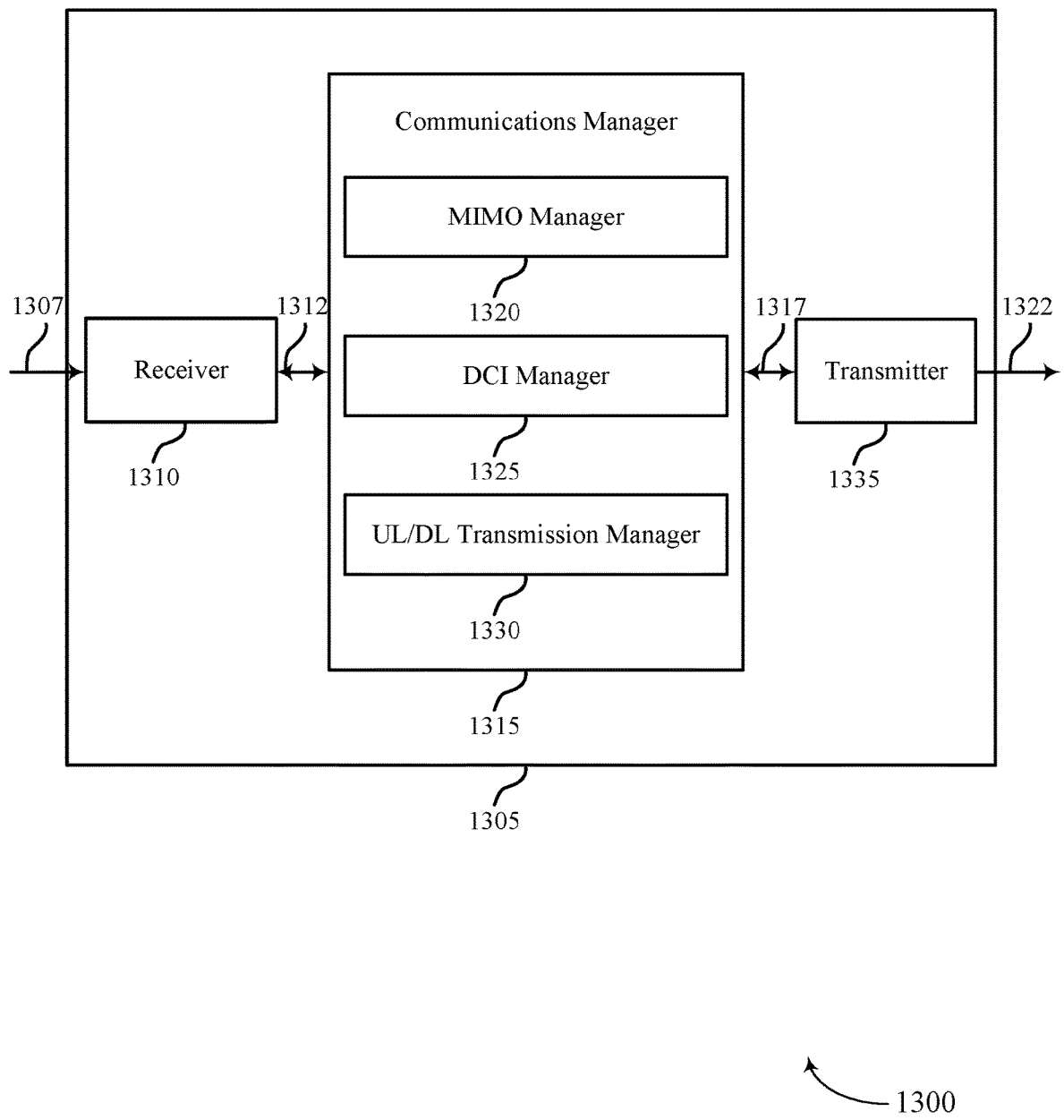

FIG. 13 shows a block diagram 1300 of a device 1305 that supports multi-user control channel transmission techniques in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive signaling 1307 via one or more antennas and may perform various operations to process the signaling (e.g., down-conversion, analog-to-digital (ADC) conversion, filtering, baseband processing, etc.) This information may be passed on to other components of the device.

The receiver 1310 may receive information such as packets, user data, or control information associated with various information channels (e.g., control channels, data channels, and information related to multi-user control channel transmission techniques, etc.) via signaling 1307. Information may be passed on to other components of the device 1305. The receiver 1310 may be an example of aspects of the transceiver 1520 described with reference to FIG. 15. The receiver 1310 may utilize a single antenna or a set of antennas. The receiver 1310 may transmit signaling 1312 to communications manager 1315.

The communications manager may receive information in signaling 1312 from receiver 1310 to perform the functions of communications manager 1315. The communications manager 1315 may be an example of aspects of the communications manager 1215 as described herein. The communications manager 1315 may include a MIMO manager 1320, a DCI manager 1325, and an UL/DL transmission manager 1330. The communications manager 1315 may be an example of aspects of the communications manager 1510 described herein. Communications manager 1315 may transmit signaling 1317 to transmitter 1320 in order to transmit signals in the wireless communications system.

The MIMO manager 1320 may receive, at a base station from a UE, an indication that the UE is capable of supporting multiple-input multiple-output (MIMO) for receiving downlink control channel communications.

The DCI manager 1325 may configure, based on the indication, a first subset of a set of downlink control channel resources for downlink control channel information transmissions from the base station, the first subset of downlink control channel resources for MIMO downlink control channel information transmissions.

The UL/DL transmission manager 1330 may transmit MIMO downlink control channel transmissions to the UE via the first subset of downlink control channel resources.

The transmitter 1335 may transmit signals 1322 generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
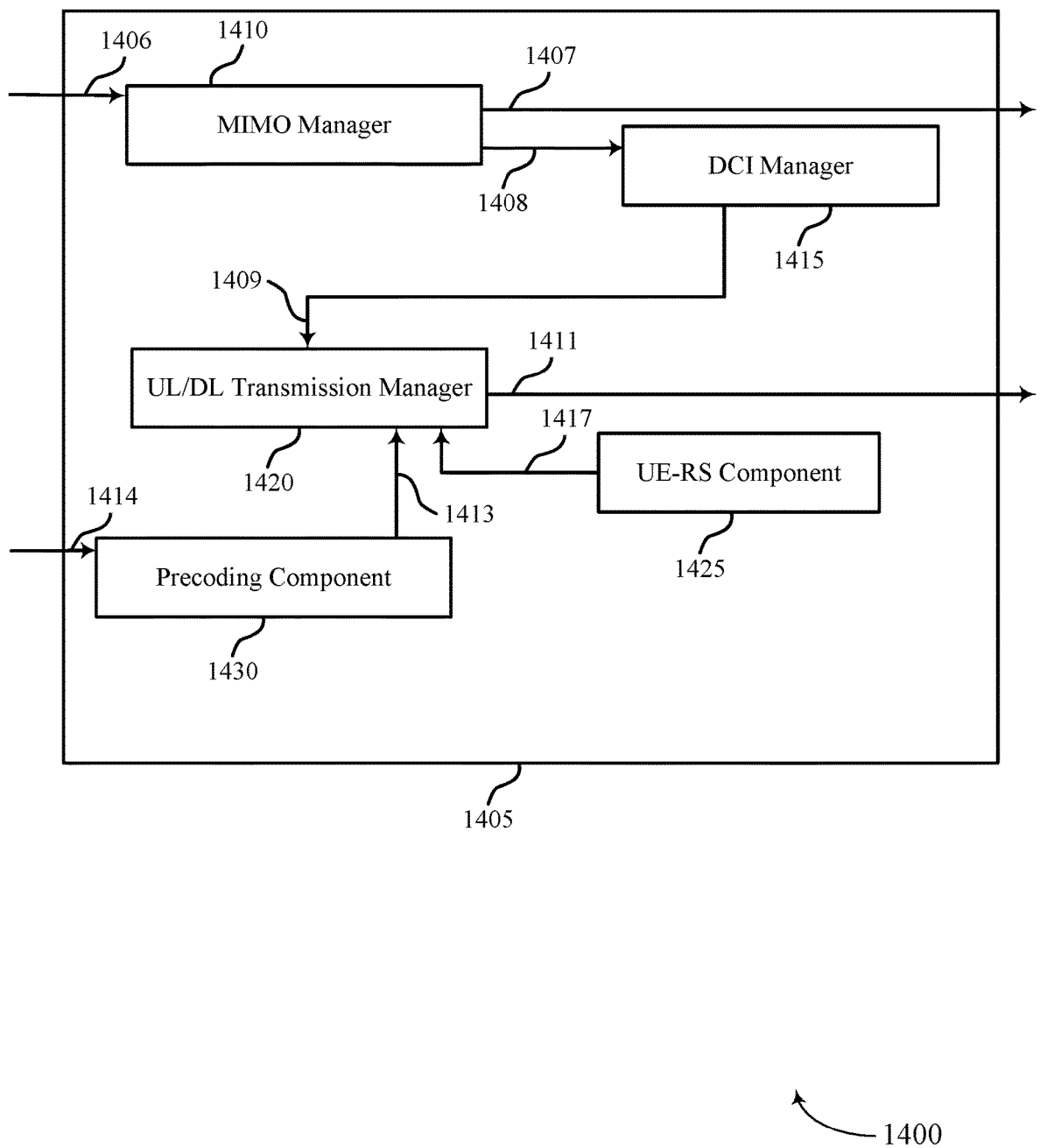
FIG. 14 shows a block diagram of a communications manager that supports multi-user control channel transmission techniques in accordance with aspects of the present disclosure.

FIG. 14 shows a block diagram 1400 of a communications manager 1405 that supports multi-user control channel transmission techniques in accordance with aspects of the present disclosure. The communications manager 1405 may be an example of aspects of a communications manager 1215, a communications manager 1315, or a communications manager 1510 described herein. The communications manager 1405 may include a MIMO manager 1410, a DCI manager 1415, an UL/DL transmission manager 1420, a UE-RS component 1425, and a precoding component 1430. Each of these modules may communicate, directly or indirectly, with one another (e.g., via one or more buses).

The MIMO manager 1410 may receive, from a UE, an indication 1406 that the UE is capable of receiving precoded (e.g., MIMO) downlink control channel communications. In some examples, the MIMO manager 1410 may transmit an indication 1407 to the UE that the first subset of downlink control channel resources includes precoded downlink control channel information transmissions. In some cases, a first portion of the first subset of downlink control channel resources include UE-RS transmissions for use in decoding associated downlink control channel transmissions, and a second portion of the first subset of downlink control channel resources include precoded transmissions that are blindly decoded at the UE. In some cases, the first subset of downlink control channel resources are non-overlapping with PCFICH resources and PHICH resources. In some cases, the set of downlink control channel resources are rate-matched around CRS resources. In some cases, the indication that the UE is capable of supporting receiving precoded downlink control channel communications includes an explicit indication transmitted to the base station or an implicit indication based on one or more other parameters transmitted to the base station. The MIMO manager 1410 may pass control channel configuration information 1408 to DCI manager 1415, indicating the support of one or more UEs for precoded downlink control channel communications.

The DCI manager 1415 may configure, based on the control channel configuration information 1408, a first subset of a set of downlink control channel resources configured for precoded downlink control channel transmissions from the base station. In some cases, the set of downlink control resources include a set of monitoring candidates for downlink control channel information, the set of monitoring candidates including a first subset of monitoring candidates for MU-MIMO downlink control channel information transmissions and a second subset of monitoring candidates for additional downlink control channel communications. In some cases, the first subset of monitoring candidates corresponds to the first subset of downlink control channel resources. In some cases, the second subset of monitoring candidates corresponds to a second subset of the set of downlink control channel resources that is different than the first subset of downlink control channel resources.

In some cases, the first subset of downlink control resources includes a first set of monitoring candidates for precoded downlink control channel communications and a second subset of the set of downlink control resources includes a second set of monitoring candidates for non-precoded downlink control channel communications, and where the first subset of downlink control resources and the second subset of downlink control resources are separately defined. In some cases, a portion of the first subset of downlink control resources puncture the second subset of downlink control resources.

The UL/DL transmission manager 1420 may transmit precoded downlink control channel transmissions 1411 to the UE via the first subset of downlink control channel resources. The UL/DL transmission manager 1420 may receive an indication 1409 of the precoded downlink control channel transmissions from DCI manager 1415.

The UE-RS component 1425 may configure a UE-RS, such as a DMRS, for transmission with precoded downlink control channel transmissions. UE-RS component 1425 may pass the configured UE-RS to UL/DL transmission manager 1420 via signaling 1417 for transmission with the precoded downlink control channel transmissions 1411. In some cases, the first subset of downlink control channel resources includes UE-RS transmissions for use in decoding the MIMO downlink control channel transmissions. In some cases, the UE-RS transmissions are based on precoding that is applied to the precoded downlink control channel transmissions. The precoding may be applied to the precoded downlink control channel transmissions 1411 based on receiving precoding information 1413 from precoding component 1430.

In some cases, a first precoding is applied to precoded downlink control channel transmissions in a first set of monitoring candidates within the first subset of downlink control channel resources, and a second precoding is applied to precoded downlink control channel transmissions in a second set of monitoring candidates within the first subset of downlink control channel resources. The first and second precoding may receive precoding information 1413 at UL/DL transmission manager 1420 from precoding component 1430 and the first and second precoding may be applied to the precoded downlink control channel transmissions 1411. In some cases, a first precoded downlink control channel transmission 1411 and a second precoded downlink control channel transmission 1411 of the first set of monitoring candidates share UE-RS transmissions and have a same precoding.

The precoding component 1430 may receive a CSI report 1414 from the UE. In some examples, the precoding component 1430 may precode downlink control channel transmissions 1411 in the first subset of downlink control channel resources based on the CSI report 1414. The precoding may be applied by the UL/DL transmission manager 1420 based on precoding information 1413 and the indication 1409 of the precoded downlink control channel transmissions. In some examples, precoding applied to downlink control channel transmissions in the first subset of downlink control channel resources is selected based on a DCI format associated with the downlink control channel transmissions, and where downlink control channel transmissions having a first DCI format are not precoded, and downlink control channel transmissions having a second DCI format are precoded.

In some cases, the UE blindly decodes downlink control channel transmissions in the first subset of downlink control channel resources using multiple different precoding candidates that are predefined for the downlink control channel transmissions. In some cases, a set of available precoding candidates for blind decoding are mapped to each of one or more monitoring occasions within the first subset of downlink control channel resources. In some cases, the CSI report includes a PMI, and the precoding is based on the PMI.

In some cases, the set of downlink control channel resources include common search space candidates that include common control information for two or more UEs, and UE-specific search space candidates that include UE-specific control information for a single UE, and where the first subset of downlink control channel resources are for transmission of the UE-specific control information. In some cases, the first subset of downlink control channel resources include at least a first UE-specific search space candidate, and at least a second UE-specific search space candidate is transmitted in a second subset of downlink control channel resources for non-MIMO control channel transmissions.

Figure 15:
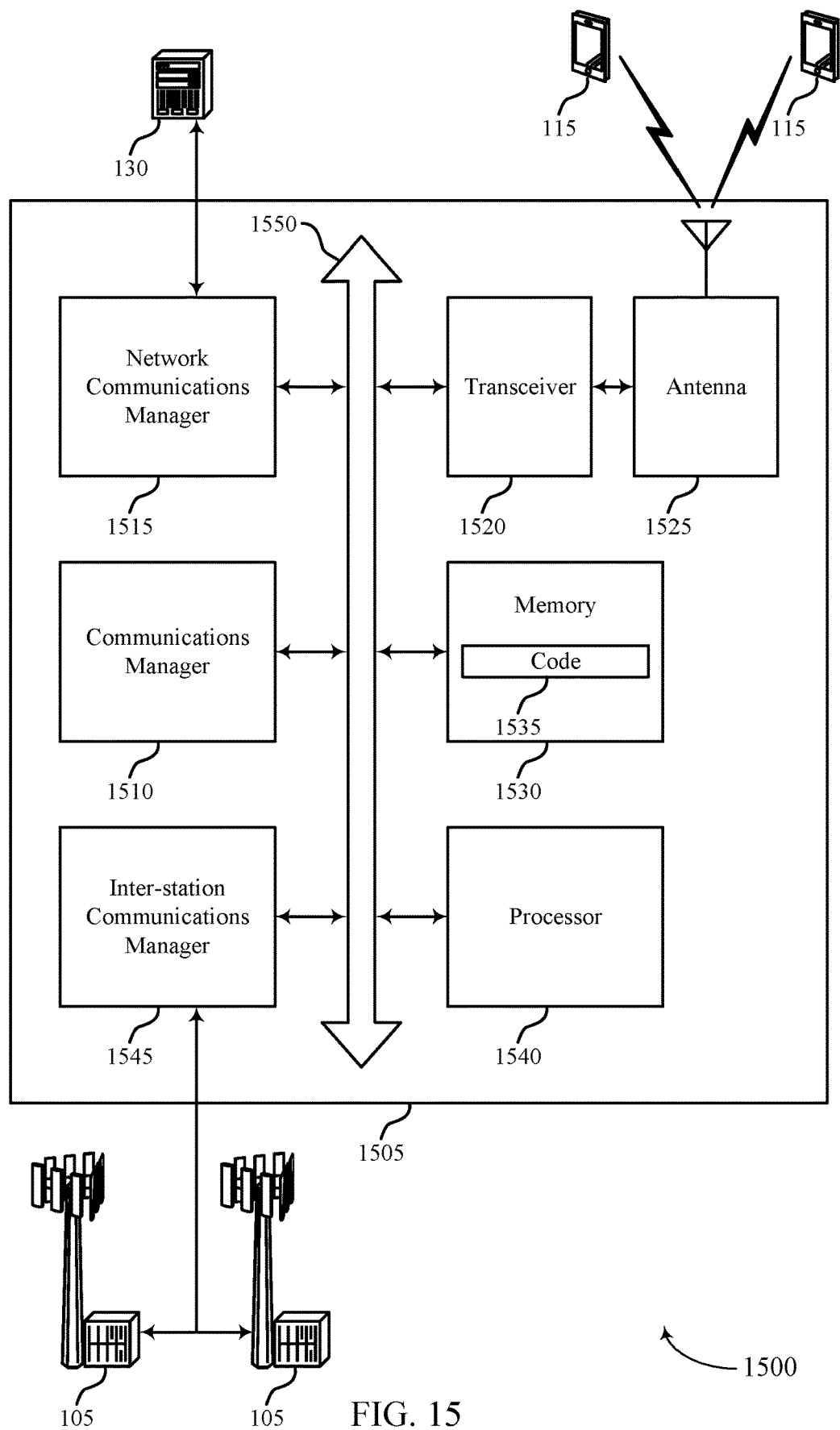
FIG. 15 shows a diagram of a system including a device that supports multi-user control channel transmission techniques in accordance with aspects of the present disclosure.

FIG. 15 shows a diagram of a system 1500 including a device 1505 that supports multi-user control channel transmission techniques in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive, at a base station from a UE, an indication that the UE is capable of supporting multiple-input multiple-output (MIMO) for receiving downlink control channel communications, configure, based on the indication, a first subset of a set of downlink control channel resources for downlink control channel information transmissions from the base station, the first subset of downlink control channel resources for MIMO downlink control channel information transmissions, and transmit MIMO downlink control channel transmissions to the UE via the first subset of downlink control channel resources.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device #{device} to perform various functions (e.g., functions or tasks supporting multi-user control channel transmission techniques).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
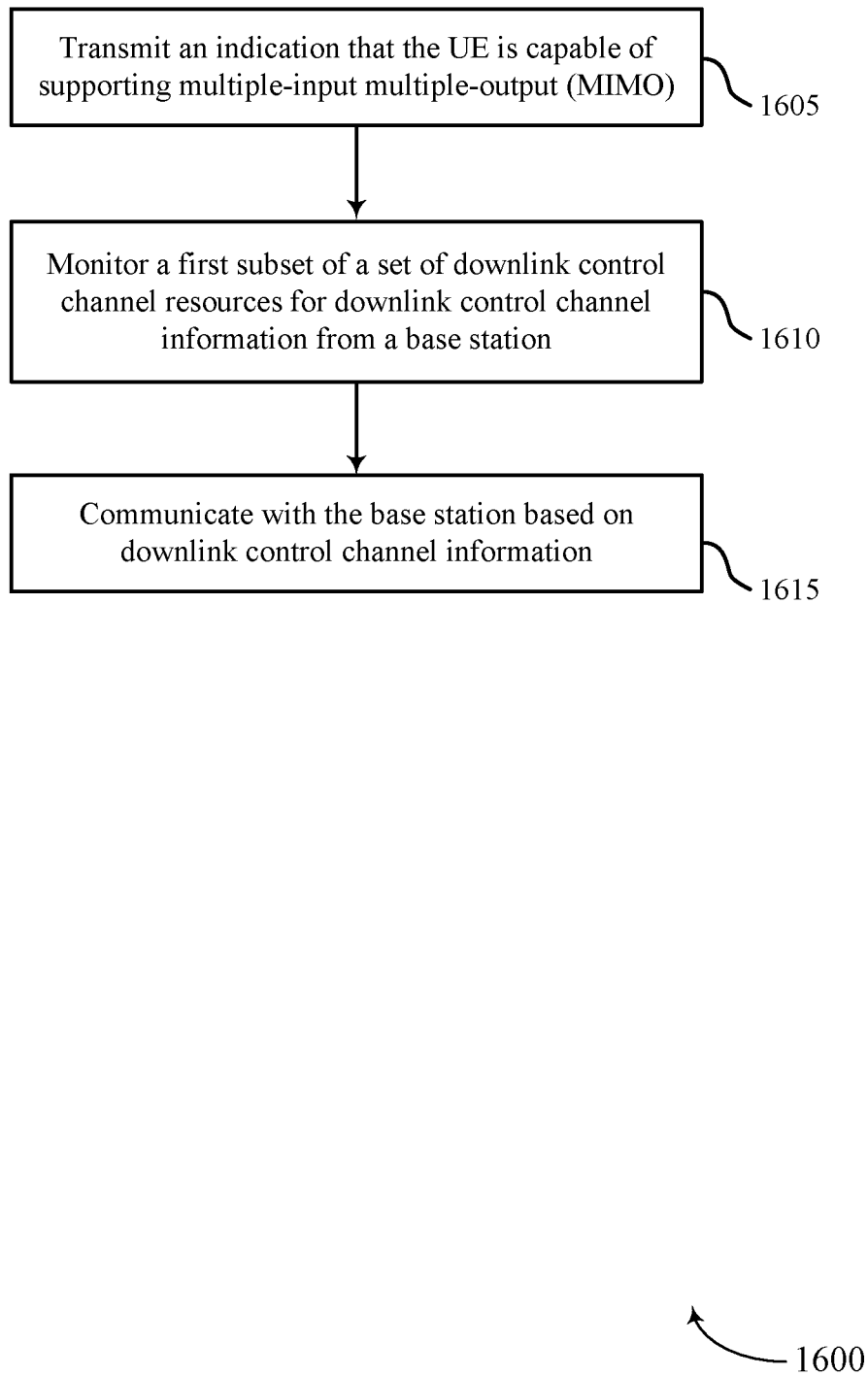
FIGS. 16 through 21 show flowcharts illustrating methods that support multi-user control channel transmission techniques in accordance with aspects of the present disclosure.

FIG. 16 shows a flowchart illustrating a method 1600 that supports multi-user control channel transmission techniques in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may transmit an indication that the UE is capable of supporting multiple-input multiple-output (MIMO) for receiving downlink control channel communications. The operations of 1605 may be performed according to the methods described herein. In some examples, aspects of the operations of 1605 may be performed by a MIMO manager as described with reference to FIGS. 8 through 11. In some cases, the indication that the UE is capable of supporting MIMO for receiving downlink control channel communications includes an explicit indication transmitted to the base station or an implicit indication based on one or more other parameters transmitted to the base station.

At 1610, the UE may monitor, based on the transmission of the indication, a first subset of a set of downlink control channel resources for downlink control channel information from a base station, the first subset of downlink control channel resources having MIMO downlink control channel information transmissions. The operations of 1610 may be performed according to the methods described herein. In some examples, aspects of the operations of 1610 may be performed by a DCI monitor as described with reference to FIGS. 8 through 11. In some cases, the set of downlink control resources include a set of monitoring candidates for downlink control channel information, the set of monitoring candidates including a first subset of monitoring entities for MU-MIMO downlink control channel information transmissions and a second subset of monitoring candidates for additional downlink control channel communications.

In some cases, the first subset of monitoring entities correspond to the first subset of downlink control channel resources. In some cases, the second subset of monitoring candidates correspond to a second subset of the set of downlink control channel resources that is different than the first subset of downlink control channel resources. In some cases, the second subset of the set of downlink control channel resources is non-overlapping with the first subset of downlink control channel resources.

In some cases, the UE may determine the first subset of downlink control channel resources based on a cell ID of the base station, one or more predetermined monitoring candidates, or any combination thereof. In some cases, the first subset of downlink control resources include a first set of monitoring entities for MIMO downlink control channel communications and a second subset of the set of downlink control resources includes a second set of monitoring candidates for non-MIMO downlink control channel communications, and where the first subset of downlink control resources and the second subset of downlink control resources are separately defined. In some cases, the first subset of downlink control channel resources includes UE-specific reference signal (UE-RS) transmissions, and where the monitoring is based on the UE-RS transmissions.

In some cases, the UE may blindly decode downlink control channel transmissions in the first subset of downlink control channel resources using multiple different precoding candidates that are predefined for the downlink control channel transmissions.

At 1615, the UE may communicate with the base station based on downlink control channel information received from the base station via the first subset of downlink control channel resources. The operations of 1660 may be performed according to the methods described herein. In some examples, aspects of the operations of 1660 may be performed by an UL/DL transmission manager as described with reference to FIGS. 8 through 11. In some cases, the communications may include MU-MIMO downlink communications from the base station. In other cases, the communications may include SU-MIMO or rank-1 beamformed downlink communications from the base station.

Figure 17:
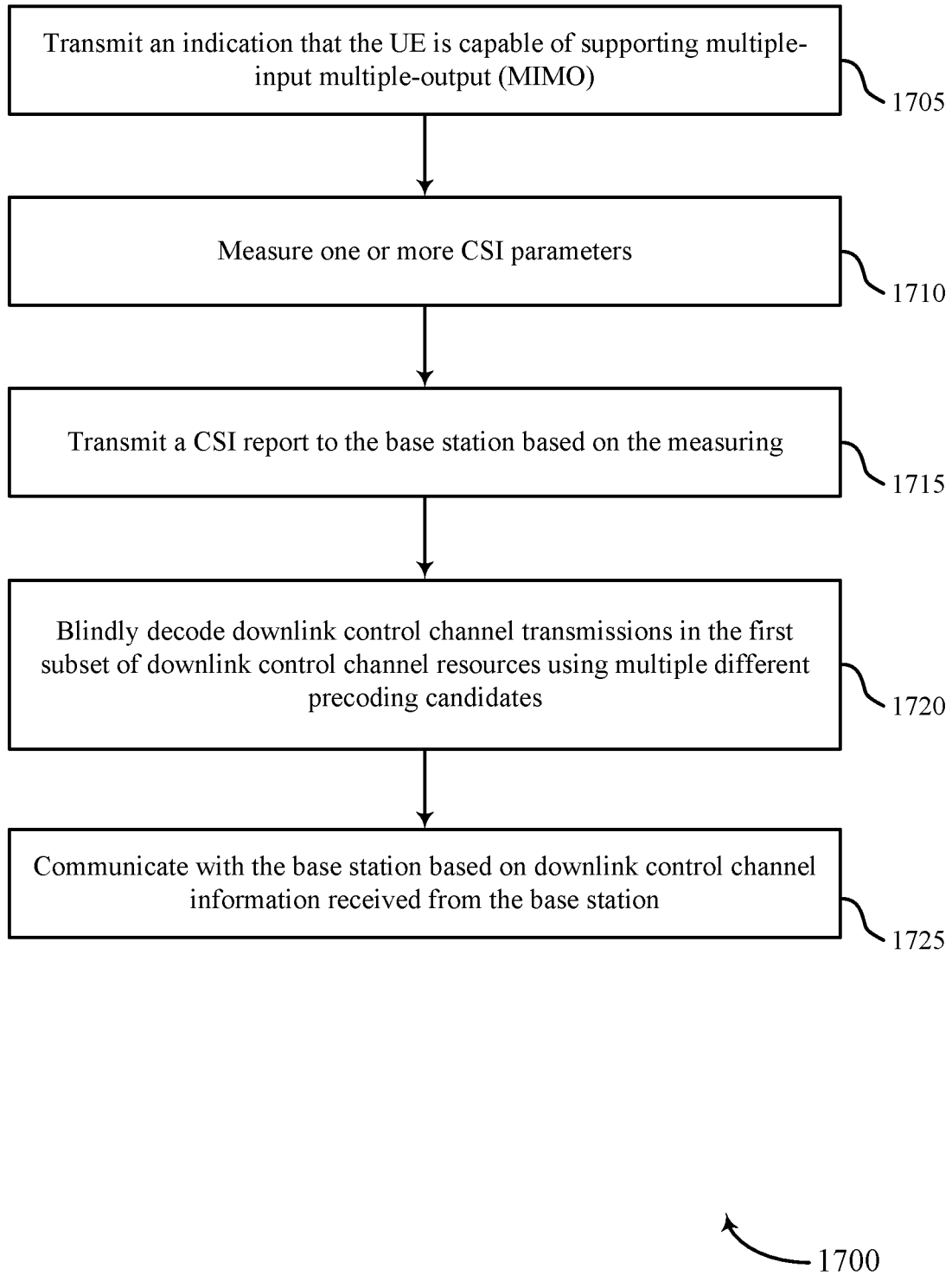

FIG. 17 shows a flowchart illustrating a method 1700 that supports multi-user control channel transmission techniques in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may transmit an indication that the UE is capable of supporting multiple-input multiple-output (MIMO) for receiving downlink control channel communications. The operations of 1705 may be performed according to the methods described herein. In some examples, aspects of the operations of 1705 may be performed by a MIMO manager as described with reference to FIGS. 8 through 11. In some cases, the indication that the UE is capable of supporting MIMO for receiving downlink control channel communications includes an explicit indication transmitted to the base station or an implicit indication based on one or more other parameters transmitted to the base station.

At 1710, the UE may measure one or more CSI parameters based on one or more reference signals received from the base station. The operations of 1710 may be performed according to the methods described herein. In some examples, aspects of the operations of 1710 may be performed by a CSI component as described with reference to FIGS. 8 through 11. In some cases, the CSI measurement may be based on a CSI reference signal that is transmitted by the base station. As part of the CSI measurement, the UE may measure one or more channel characteristics of a downlink channel of the base station, which may indicate a precoding that is to be used for subsequent transmissions to the UE, for example.

At 1715, the UE may transmit a CSI report to the base station based on the measuring. The operations of 1715 may be performed according to the methods described herein. In some examples, aspects of the operations of 1715 may be performed by a CSI component as described with reference to FIGS. 8 through 11. Such a measurement report may include various measurement information, which may include a PMI that is selected by the UE. The measurement report may be transmitted in uplink resources that are allocated for uplink transmissions of measurement reports, such as in a PUSCH transmission with resources allocated to the UE. In some cases, the measurement report may be generated based on an aperiodic CSI request from the base station, using resources that are indicated in the trigger for the aperiodic CSI report.

At 1720, the UE may blindly decode downlink control channel transmissions in the first subset of downlink control channel resources using multiple different precoding candidates that are predefined for the downlink control channel transmissions. The operations of 1720 may be performed according to the methods described herein. In some examples, aspects of the operations of 1720 may be performed by a blind decoding component as described with reference to FIGS. 8 through 11. In some cases, the set of available precoding candidates for blind decoding is based on the CSI report.

At 1725, the UE may communicate with the base station based on downlink control channel information received from the base station via the first subset of downlink control channel resources. The operations of 1725 may be performed according to the methods described herein. In some examples, aspects of the operations of 1725 may be performed by an UL/DL transmission manager as described with reference to FIGS. 8 through 11. In some cases, the communications may include MU-MIMO downlink communications from the base station. In other cases, the communications may include SU-MIMO or rank-1 beamformed downlink communications from the base station.

Figure 18:
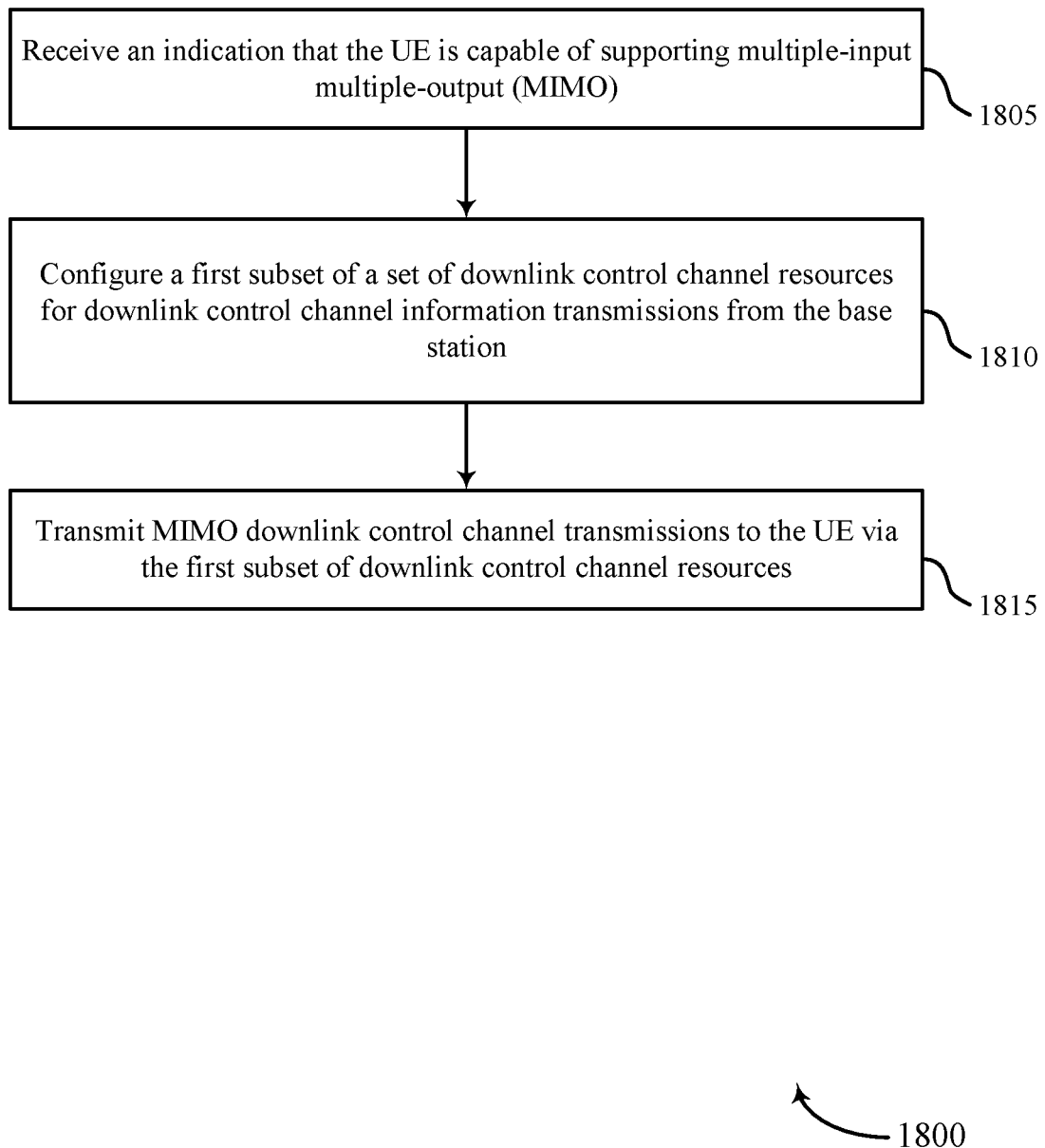

FIG. 18 shows a flowchart illustrating a method 1800 that supports multi-user control channel transmission techniques in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, an indication that the UE is capable of supporting multiple-input multiple-output (MIMO) for receiving downlink control channel communications. The operations of 1805 may be performed according to the methods described herein. In some examples, aspects of the operations of 1805 may be performed by a MIMO manager as described with reference to FIGS. 12 through 15. In some cases, the indication that the UE is capable of supporting MIMO for receiving downlink control channel communications includes an explicit indication transmitted to the base station or an implicit indication based on one or more other parameters transmitted to the base station.

At 1810, the base station may configure, based on the indication, a first subset of a set of downlink control channel resources for downlink control channel information transmissions from the base station, the first subset of downlink control channel resources for MIMO downlink control channel information transmissions. The operations of 1810 may be performed according to the methods described herein. In some examples, aspects of the operations of 1810 may be performed by a DCI manager as described with reference to FIGS. 12 through 15. In some cases, the set of downlink control resources include a set of monitoring candidates for downlink control channel information, the set of monitoring candidates including a first subset of monitoring candidates for MU-MIMO downlink control channel information transmissions and a second subset of monitoring candidates for additional downlink control channel communications. In some cases, the first subset of monitoring candidates correspond to the first subset of downlink control channel resources. In some cases, the second subset of monitoring candidates correspond to a second subset of the set of downlink control channel resources that are different than the first subset of downlink control channel resources.

At 1815, the base station may transmit MIMO downlink control channel transmissions to the UE via the first subset of downlink control channel resources. The operations of 1815 may be performed according to the methods described herein. In some examples, aspects of the operations of 1815 may be performed by an UL/DL transmission manager as described with reference to FIGS. 12 through 15.

Figure 19:
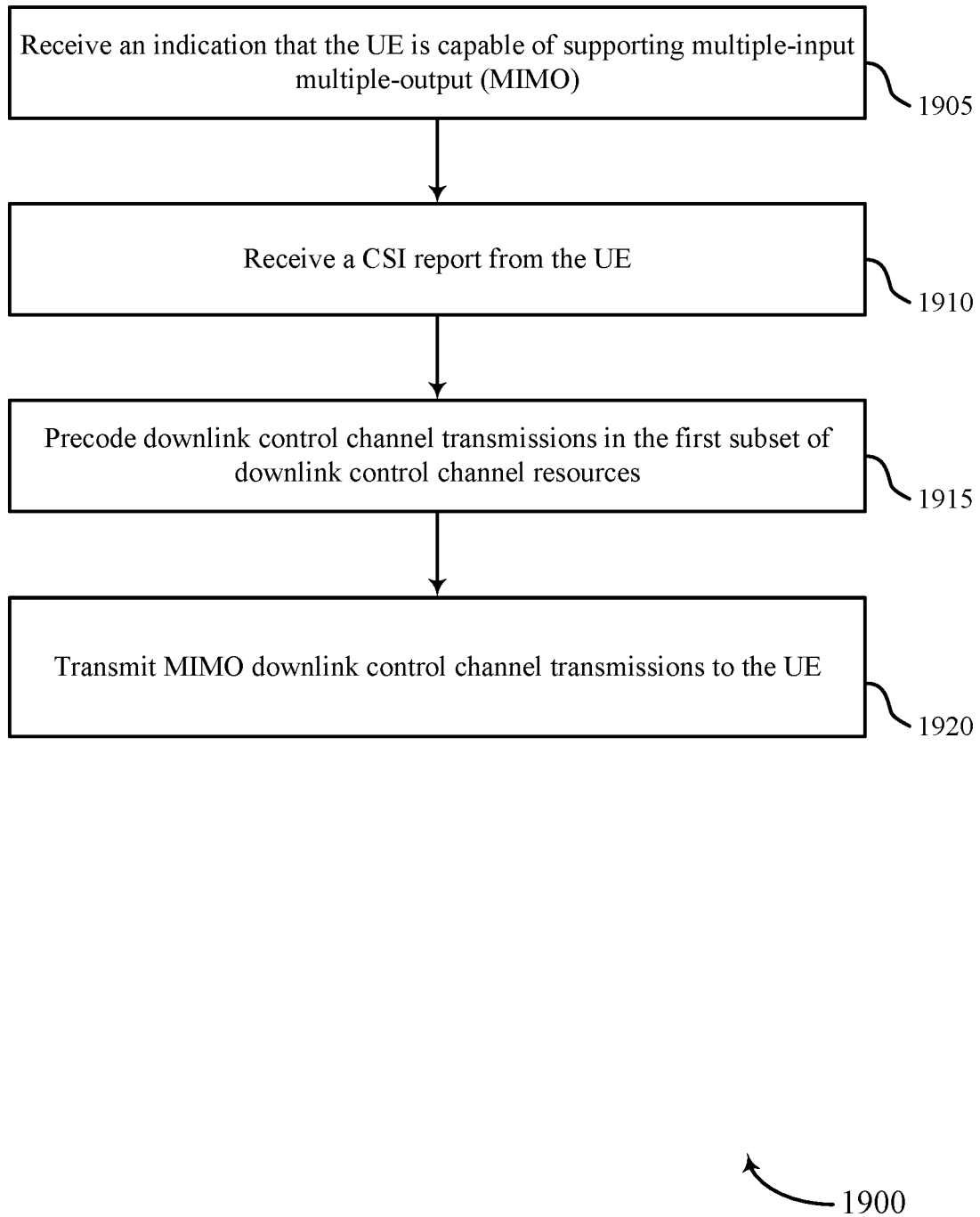

FIG. 19 shows a flowchart illustrating a method 1900 that supports multi-user control channel transmission techniques in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a UE, an indication that the UE is capable of supporting multiple-input multiple-output (MIMO) for receiving downlink control channel communications. The operations of 1905 may be performed according to the methods described herein. In some examples, aspects of the operations of 1905 may be performed by a MIMO manager as described with reference to FIGS. 12 through 15. In some cases, the indication that the UE is capable of supporting MIMO for receiving downlink control channel communications includes an explicit indication transmitted to the base station or an implicit indication based on one or more other parameters transmitted to the base station.

At 1910, the base station may receive a CSI report from the UE. The operations of 1910 may be performed according to the methods described herein. In some examples, aspects of the operations of 1910 may be performed by a precoding component as described with reference to FIGS. 12 through 15. In some cases, the CSI measurement may be based on a CSI reference signal that is transmitted by the base station. As part of the CSI measurement, the UE may measure one or more channel characteristics of a downlink channel of the base station, which may indicate a precoding that is to be used for subsequent transmissions to the UE, for example.

At 1915, the base station may precode downlink control channel transmissions in the first subset of downlink control channel resources based on the CSI report. The operations of 1915 may be performed according to the methods described herein. In some examples, aspects of the operations of 1915 may be performed by a precoding component as described with reference to FIGS. 12 through 15. In some cases, the precoding applied to the downlink control channel transmission is based on a PMI that is provided in the CSI report.

At 1920, the base station may transmit MIMO downlink control channel transmissions to the UE via the first subset of downlink control channel resources. The operations of 1920 may be performed according to the methods described herein. In some examples, aspects of the operations of 1920 may be performed by an UL/DL transmission manager as described with reference to FIGS. 12 through 15. In some cases, the UE blindly decodes downlink control channel transmissions in the first subset of downlink control channel resources using a decoding candidate that corresponds to a PMI provided with the CSI report.

Figure 20:
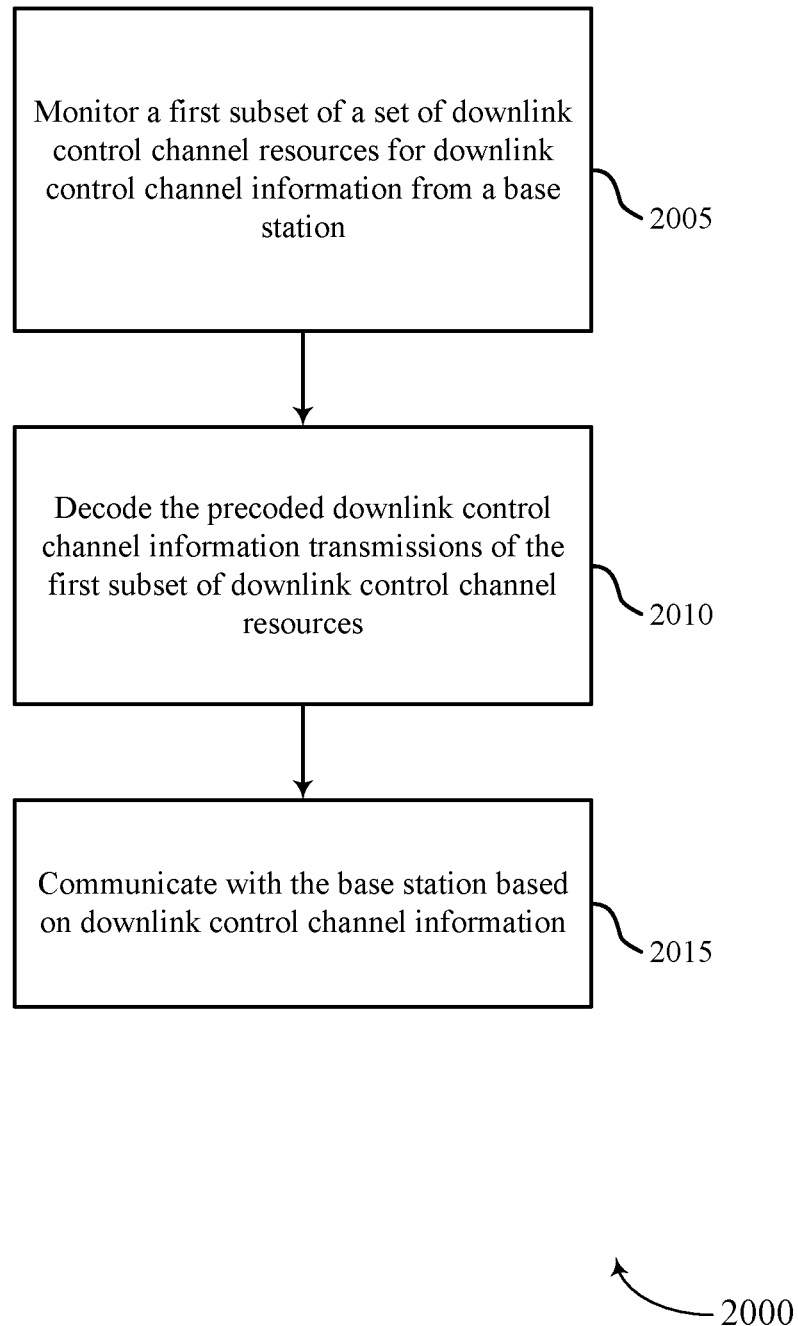

FIG. 20 shows a flowchart illustrating a method 2000 that supports multi-user control channel transmission techniques; in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may monitor a first subset of a set of downlink control channel resources for downlink control channel information from a base station, the first subset of downlink control channel resources having precoded downlink control channel information transmissions. The operations of 2005 may be performed according to the methods described herein. In some examples, aspects of the operations of 2005 may be performed by a DCI manager as described with reference to FIGS. 8 through 11.

At 2010, the UE may decode the precoded downlink control channel information transmissions of the first subset of downlink control channel resources based on applying one or more precoding candidates to a cell-specific reference signal (CRS). For example, the UE may apply a first precoding candidate to the CRS and attempt to decode a control channel candidate using the channel estimation provided by applying the precoding candidate to the CRS. If the decoding is successful, the downlink control information may be extracted for use in communications with the base station. If the decoding is unsuccessful using the first precoding candidate, as second precoding candidate may be applied to the CRS for channel estimation and the decoding operation repeated on the control channel candidate. The procedure may be repeated until the control channel candidate is successfully decoded, or until all precoding candidates have been applied across all control channel candidates (e.g., across a search space). The operations of 2010 may be performed according to the methods described herein. In some examples, aspects of the operations of 2010 may be performed by a blind decoding component as described with reference to FIGS. 8 through 11.

At 2015, the UE may communicate with the base station based on downlink control channel information decoded from the precoded downlink control channel information transmissions. The operations of 2015 may be performed according to the methods described herein. In some examples, aspects of the operations of 2015 may be performed by a UL/DL transmission manager as described with reference to FIGS. 12 through 15.

Figure 21:
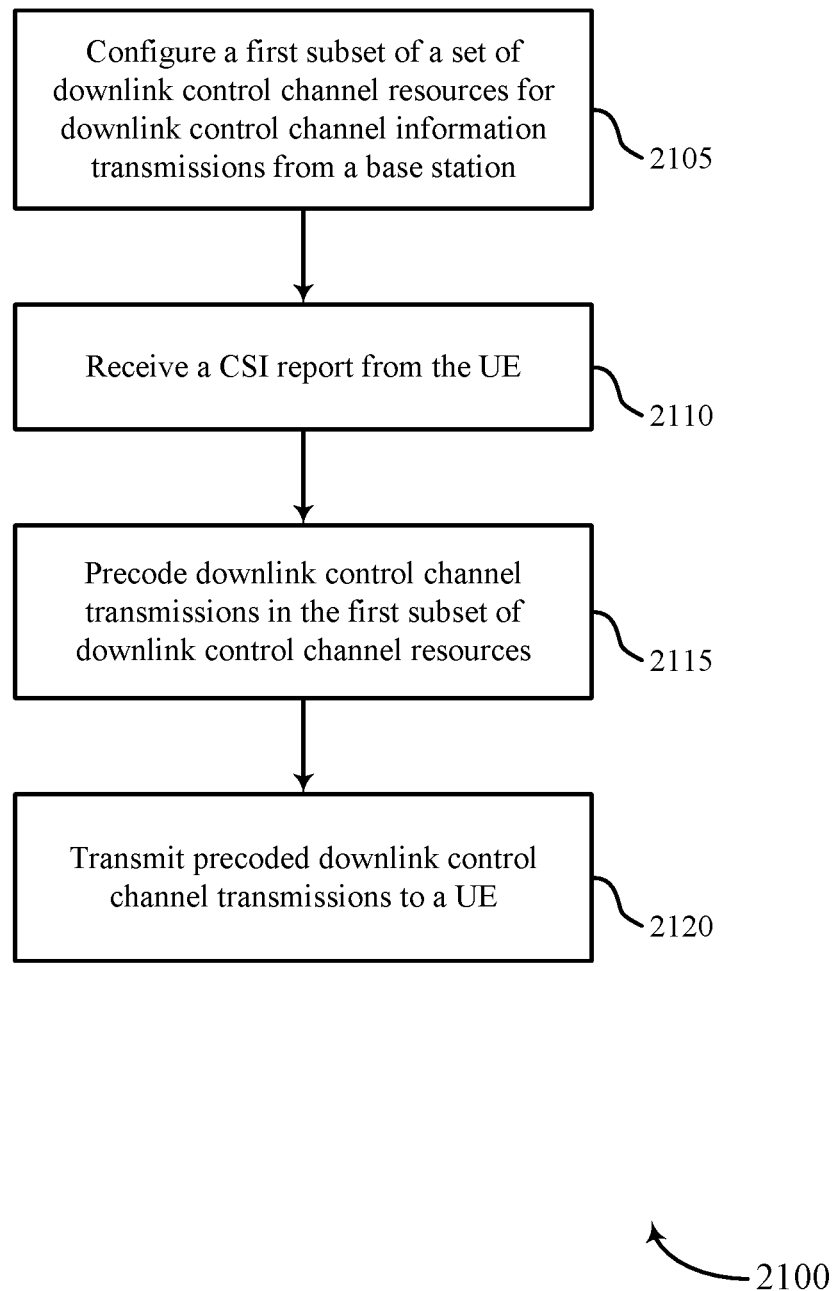

FIG. 21 shows a flowchart illustrating a method 2100 that supports multi-user control channel transmission techniques; in accordance with aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may configure a first subset of a set of downlink control channel resources for downlink control channel information transmissions from a base station, the first subset of downlink control channel resources having precoded downlink control channel information transmissions. The operations of 2105 may be performed according to the methods described herein. In some examples, aspects of the operations of 2105 may be performed by a DCI manager as described with reference to FIGS. 8 through 11.

At 2110, the base station may receive a CSI report from the UE. The operations of 2110 may be performed according to the methods described herein. In some examples, aspects of the operations of 2110 may be performed by a UL/DL transmission manager as described with reference to FIGS. 12 through 15.

At 2115, the base station may precode downlink control channel transmissions in the first subset of downlink control channel resources based on the CSI report. The operations of 2115 may be performed according to the methods described herein. In some examples, aspects of the operations of 2115 may be performed by a precoding component as described with reference to FIGS. 12 through 15.

At 2120, the base station may transmit precoded downlink control channel transmissions to a UE via the first subset of downlink control channel resources. The operations of 2120 may be performed according to the methods described herein. In some examples, aspects of the operations of 2120 may be performed by a UL/DL transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies described herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
monitoring a first set of downlink control channel resources for downlink control information from a base station, the first set of downlink control channel resources being associated with precoded downlink control channel transmissions;
decoding a precoded downlink control channel transmission from the first set of downlink control channel resources based at least in part on applying one or more precoding candidates to a cell-specific reference signal, wherein a set of available precoding candidates for blind decoding are mapped to each of one or more monitoring occasions within the first set of downlink control channel resources; and
communicating with the base station based at least in part on downlink control information decoded from the precoded downlink control channel transmission.

2. The method of claim 1, wherein the decoding the precoded downlink control channel transmission further comprises:
blindly decoding the precoded downlink control channel transmissions in the first set of downlink control channel resources using the one or more precoding candidates.

3. The method of claim 2, wherein a first monitoring occasion and a second monitoring occasion of the one or more monitoring occasions are associated with a same precoding candidate.

4. The method of claim 2, further comprising:
measuring one or more channel state information (CSI) parameters based on one or more CSI reference signals received from the base station; and
transmitting a CSI report to the base station based at least in part on the measuring,
wherein the set of available precoding candidates for the blindly decoding are based at least in part on the CSI report.

5. The method of claim 4, wherein the CSI report includes a precoding matrix indicator (PMI), and wherein a first precoding candidate for the blindly decoding is based on the PMI.

6. The method of claim 2, wherein a first subset of the set of downlink control channel resources include common search space candidates comprising common control information for two or more UEs, and UE-specific search space candidates comprising UE-specific control information for a single UE, and wherein the first subset of the set of downlink control channel resources are for transmission of the UE-specific control information.

7. The method of claim 6, wherein the first subset of the set of downlink control channel resources include at least a first UE-specific search space entity, and at least a second UE-specific search space entity is transmitted in a second subset of the set of downlink control channel resources for non-multiple-input multiple-output (MIMO) control channel transmissions.

8. The method of claim 2, wherein the blind decoding is performed for a first downlink control information (DCI) format associated with a first subset of the set of downlink control channel resources associated with the precoded downlink control channel transmissions and a second DCI format associated with a second subset of the set of downlink control channel resources associated with a non-precoded downlink control channel transmissions.

9. The method of claim 8, wherein the second subset of downlink control channel resources include UE-specific reference signals (UE-RS) for decoding associated downlink control channel transmissions.

10. The method of claim 9, further comprising:
receiving, in radio resource control (RRC) signaling, an indicator of whether UE-RSs or blind decoding is to be used to decode the second subset of the set of downlink control channel resources.

11. The method of claim 1, wherein the first set of downlink control resources includes a plurality of monitoring candidates for the downlink control information, the plurality of monitoring candidates including a first set of monitoring candidates for multi-user (MU) multiple-input multiple-output (MIMO) downlink control channel transmissions and a second set of monitoring candidates for non-MU-MIMO downlink control channel communications.

12. The method of claim 11, wherein the first set of monitoring candidates corresponds to the first set of downlink control channel resources, and the second subset of monitoring candidates corresponds to a second set of downlink control channel resources that is different than the first set of downlink control channel resources, and wherein the first set of downlink control channel resources and the second set of downlink control channel resources are separately configured.

13. The method of claim 1, wherein the first set of downlink control channel resources is non-overlapping with physical control format indicator channel (PCFICH) resources and physical HARQ indicator channel (PHICH) resources.

14. The method of claim 1, wherein the set of downlink control channel resources are rate-matched around cell-specific reference signal (CRS) resources.

15. A method for wireless communication, comprising:
configuring a first set of downlink control channel resources for downlink control information at a base station, the first set of downlink control channel resources being associated with precoded downlink control channel transmissions, wherein a set of available precoding candidates for blind decoding are mapped to each of one or more monitoring occasions within the first set of downlink control channel resources; and
transmitting a precoded downlink control channel transmission to a user equipment (UE) via the first set of downlink control channel resources.

16. The method of claim 15, wherein the UE blindly decodes the precoded downlink control channel transmission in the first set of downlink control channel resources using one or more precoding candidates in the first set of downlink control channel resources using one or more of the precoding candidates corresponding to the precoded downlink control channel transmissions.

17. The method of claim 16, further comprising:
receiving a channel state information (CSI) report from the UE; and
precoding the downlink control channel transmissions in the first set of downlink control channel resources based at least in part on the received CSI report.

18. The method of claim 17, wherein the CSI report comprises a precoding matrix indicator (PMI), and wherein the precoding is based on the PMI.

19. The method of claim 16, wherein a first subset of the set of downlink control channel resources include common search space candidates comprising common control information for two or more UEs, and UE-specific search space candidates comprising UE-specific control information for a single UE, and wherein the first subset of the set of downlink control channel resources are for transmission of the UE-specific control information.

20. The method of claim 16, further comprising:
selecting a precoder for the downlink control channel transmissions in the first subset of the set of downlink control channel resources based at least in part on a first downlink control information (DCI) format associated with a first set of the downlink control channel transmissions, wherein a second DCI format is associated with a second set of the downlink control channel transmissions are not precoded.

21. The method of claim 15, wherein the first set of downlink control resources includes a plurality of monitoring candidates for the downlink control information, the plurality of monitoring candidates including a first set of monitoring candidates for multi-user (MU) multiple-input multiple-output (MIMO) downlink control channel transmissions and a second set of monitoring candidates for non-MU-MIMO downlink control channel communications.

22. The method of claim 21, wherein the first set of monitoring candidates corresponds to the first set of downlink control channel resources, and the second set of monitoring candidates corresponds to a second set of downlink control channel resources that is different than the first set of downlink control channel resources, and wherein the first set of downlink control channel resources and the second set of downlink control channel resources are separately configured.

23. An apparatus for wireless communication, comprising:
a processor,
memory coupled with the processor; and
instructions stored in the memory and executable by the processor to cause the apparatus to:
monitor a first set of downlink control channel resources for downlink control channel information from a base station, the first set of downlink control channel resources having precoded downlink control channel information transmissions;
decode the precoded downlink control channel information transmissions of the first set of downlink control channel resources based at least in part on applying one or more precoding candidates to a cell-specific reference signal, wherein a set of available precoding candidates for blind decoding are mapped to each of one or more monitoring occasions within the first set of downlink control channel resources; and
communicate with the base station based at least in part on downlink control channel information decoded from the precoded downlink control channel information transmissions.

24. The apparatus of claim 23, wherein the instructions to decode the precoded downlink control channel transmission are executable by the processor to cause the apparatus to:
blindly decode the precoded downlink control channel transmissions in the first set of downlink control channel resources using the one or more precoding candidates.

25. An apparatus for wireless communication, comprising:
a processor,
memory coupled with the processor; and
instructions stored in the memory and executable by the processor to cause the apparatus to:
configure a first set of downlink control channel resources for downlink control channel information transmissions from a base station, the first set of downlink control channel resources having precoded downlink control channel information transmissions, wherein a set of available precoding candidates for blind decoding are mapped to each of one or more monitoring occasions within the first set of downlink control channel resources; and
transmit precoded downlink control channel transmissions to a UE via the first set of downlink control channel resources.

26. The apparatus of claim 25, wherein the UE blindly decodes the precoded downlink control channel transmission in the first set of downlink control channel resources using one or more precoding candidates in the first set of downlink control channel resources using one or more of the precoding candidates corresponding to the precoded downlink control channel transmissions.

* * * * *